(12) United States Patent
Cohen et al.

(10) Patent No.: US 8,564,623 B2
(45) Date of Patent: Oct. 22, 2013

(54) INTEGRATED DATA VISUALIZATION FOR MULTI-DIMENSIONAL MICROSCOPY

(75) Inventors: Avrum I. Cohen, Downingtown, PA (US); Jerry M. Rubinow, West Chester, PA (US); Steven P. Boyd, West Chester, PA (US); Arad Shaiber, Philadelphia, PA (US)

(73) Assignee: Molecular Devices, LLC, Sunnyvale, CA (US)

( * ) Notice: Subject to any disclaimer, the term of this patent is extended or adjusted under 35 U.S.C. 154(b) by 893 days.

(21) Appl. No.: 12/636,568

(22) Filed: Dec. 11, 2009

(65) Prior Publication Data

US 2011/0141103 A1     Jun. 16, 2011

(51) Int. Cl.
*G09G 5/14*     (2006.01)

(52) U.S. Cl.
USPC .......... 345/634; 345/635; 345/661; 345/676

(58) Field of Classification Search
CPC ............................ G09G 5/14; G09G 2340/12
USPC ................ 345/661–665, 676–680, 634, 635; 348/80
See application file for complete search history.

(56) References Cited

U.S. PATENT DOCUMENTS

| 2008/0008401 | A1* | 1/2008 | Zhu et al. ....................... 382/294 |
| 2009/0226061 | A1  | 9/2009 | Maiya |
| 2009/0237502 | A1  | 9/2009 | Maiya |
| 2010/0131885 | A1* | 5/2010 | Licato et al. .................. 715/781 |

FOREIGN PATENT DOCUMENTS

EP     1691230 A1     8/2006

OTHER PUBLICATIONS

N. S. White, Visualization Systems for Multi-Dimensional Microscopy Images, 2006, Handbook of Biological Confocal Microscopy, Third Edition, edited by James B. Pawley, Springer Science+Business Media, LLC, New York, 2006, pp. 280-315.*
International Search Report and Written Opinion mailed Sep. 24, 2010, for Application No. PCT US/2009/067751.
Alain Briot, "Dx0 Optics Pro v5—A Review and Tuturial," DXO Image Science, XP002598293, Feb. 2008, 20 pages. (Retrieved from internet www.dxo.com/var/dxo/storage/original/application/59ec5161f7ec8b53382580477f6ddb0d.pdf).

* cited by examiner

*Primary Examiner* — Jeffrey A Brier
(74) *Attorney, Agent, or Firm* — Bella Fishman

(57) ABSTRACT

Methods, systems, and apparatus, including computer programs encoded on a computer storage medium, for implementing an integrated data visualization interface for multi-dimensional microscopy image and measurement data are disclosed. The integrated data visualization interface utilizes the known dimensional relational relationships between the images to automatically provide synchronized and coordinated visualization and manipulations across multiple related images and measurement data in multiple dataset viewer components (e.g., image grids, browsable image strips, tables, and graphs). Other features of the dataset viewer components are also disclosed.

17 Claims, 11 Drawing Sheets

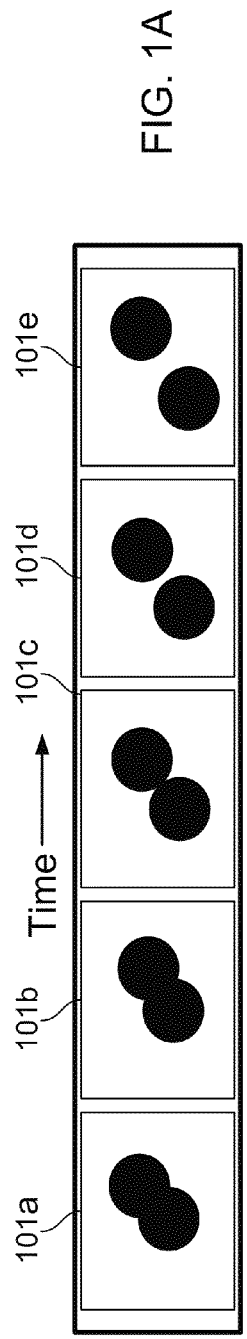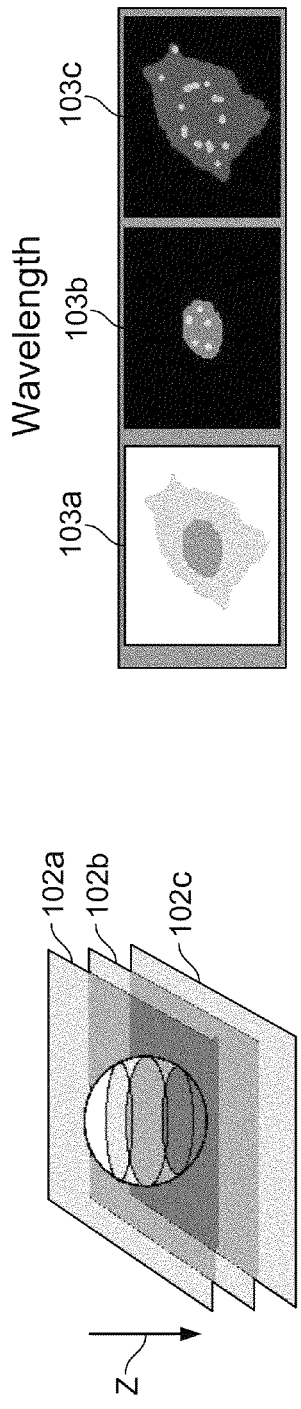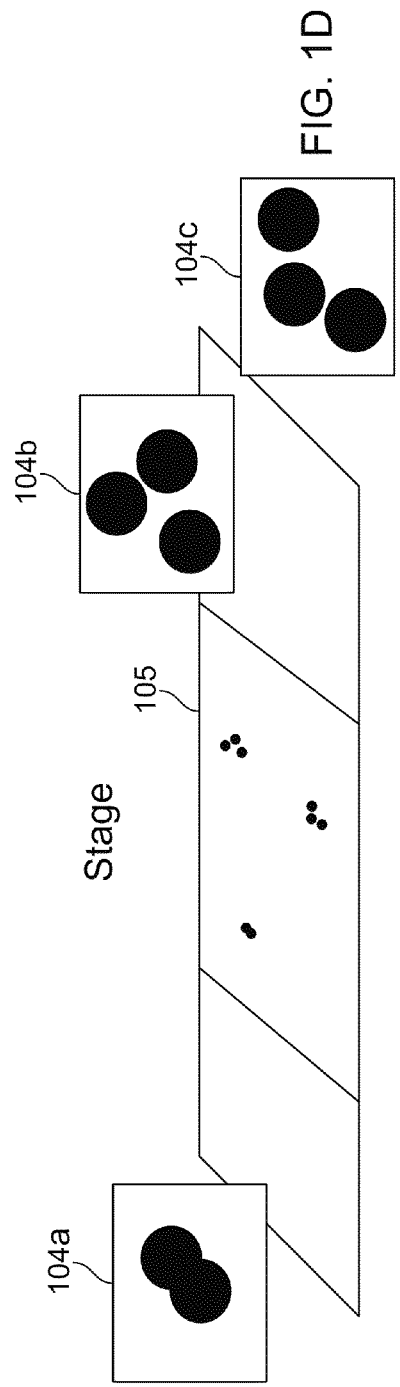
FIG. 1A
FIG. 1B
FIG. 1C
FIG. 1D

INTEGRATED DATA VISUALIZATION FOR MULTI-DIMENSIONAL MICROSCOPY

TECHNICAL FIELD

The technology described herein relates to integrated visualization and manipulation of multi-dimensional microscopy image datasets.

BACKGROUND

Integrated microscopy systems have contributed to the rapid growth of scientific breakthroughs in many disciplines, and particularly in the biosciences. Many such systems have associated image acquisition, processing, and analysis capabilities. For each microscopy experiment, a system can produce images and measurement data in multiple image-collection dimensions. For example, in addition to the lateral dimensions (e.g., the X-Y dimensions in the plane of the sample or object being viewed), images can be acquired at multiple focus positions (e.g., in the Z, or Focus Position, dimension), at multiple wavelengths using different fluorochromes or microscopy techniques (e.g., in the Wavelength or Channel dimension), during a time lapse (e.g., in the Time dimension), and/or over multiple areas in a sample (e.g., in the Stage dimension), during a multi-dimensional experiment. Numeric measurement data can also be derived from the images.

Visualization of the images and measurement data of a multi-dimensional experiment e.g., a set of measurements on a biological sample, allows a user to identify, assess, and compare features within the sample, under different experimental conditions, at different times, and in different areas within the sample.

Various visualization techniques have been developed to better facilitate the understanding and analysis of such sets of images and measurement data. For example, fluorescent images taken at different wavelengths tend to highlight different structures in a biological sample; these images can be aligned in a stack to produce a composite image to show the set of features and structures in the sample and their spatial relationships. By way of another example, images taken at different times can show the evolution of the sample over time; these images can be played in sequence, as in a movie, to allow the user to quickly visualize the changes in the sample over time. Furthermore, images taken along different spatial dimensions (e.g., the X-Y, and Z dimensions) can be combined and rendered as a 3D reconstruction, projected onto a particular dimension, or stitched together to form a cross-sectional view of the entire sample.

To further improve the image viewing quality, many currently available systems also have built-in software components that can apply various image processing techniques to the image data to reduce noise, sharpen focus, enhance certain regions of interest, create topographical surface maps of the image, and carry out other analyses.

In addition to viewing the image data, various computational and image processing techniques can be used, within currently available systems, to identify and characterize objects and structures in the acquired images. Numeric measurement data can be obtained from the images for the identified objects and structures and includes, for example, cell cycle measurements, cell or nuclei scoring, colocalization and brightness measurements, and movement data for identified objects. The measurement data for different images can be correlated with one another, or with values in one or more image-collection dimensions, and presented in graphs or tables along with the images.

However, currently available systems can capture images at a very high rate. A typical multi-dimensional experiment can easily produce tens of thousands of images available for viewing in a matter of minutes. A vast amount of information is embedded in the images and measurement data obtained from each multi-dimensional experiment. Understanding how any given image relates to another image is challenging. Extracting meaningful relationships and useful information out of the images and measurements are more challenging.

To interpret and understand the image and measurement data, the user often has to make comparisons between related images of different time points, different locations, different samples, or different experiments to identify and assess the commonality or differences in the related images. Although the currently available systems are capable of presenting images and numeric measurement data in graphs and tables along with the images, typically the selection and mode of presentation of images and measurement data must be decided by the user.

For example, if a user wishes to do a side-by-side comparison of two images containing a common object of interest, the user typically has to manually select the images from a database, place them side by side in an image viewer, and manipulate each image individually to locate the region of interest in the image in order to finally view the images side by side for proper comparison. When the user needs to examine the numeric data for the same images, the user also has to locate the correct file for numeric data associated with the images. This process can become very time consuming and tedious if the user has to compare a large number of images. Sometimes, the task becomes virtually impossible, because the user may not always be able to remember or even be aware of which images show the same object of interest, and therefore are not able to locate the appropriate images for visual comparison.

Furthermore, although images and data in multiple dimensions are available to the user, the user has to be familiar with the organization of the images in store in order to locate the images that he or she wishes to view. Navigating the tens of thousands of images in a typical multi-dimensional experiment is difficult without the help of some effective navigation tools. Even if the user makes an attempt to keep track of the relationships between the images and data (e.g., through use of descriptive filenames and folder hierarchies), this process is often error-prone. Errors in matching the images with the correct measurement data are often difficult to detect because the images in different datasets tend to be very similar in appearance. Important discoveries can be missed and gross misunderstandings can be caused by incorrect manual correlation of images by the user.

Therefore, there is a need for an integrated image visualization and manipulation interface that is fast and efficient, and simplifies the process for image navigation, review, and comparison of related images and measurement data from multi-dimensional experiments.

SUMMARY

This specification describes technologies relating to image visualization and manipulation for multi-dimensional microscopy datasets.

In general, one innovative aspect of the subject matter described in this specification can be embodied in methods that include the actions of: displaying a first plurality of images in a first two-dimensional image grid, wherein a first and a second dimension of the first two-dimensional image grid are selected from a plurality of image-collection dimensions including Time, Stage, Channel, and Focus Position, wherein the first plurality of images are selected from a first multi-dimensional dataset comprising images of a biological sample, each image in the first plurality of images being associated with a respective value in each of the first and the second dimensions, and wherein the first plurality of images are associated with a common value in a third dimension selected from the plurality of image-collection dimensions and are ordered in the first two-dimensional image grid according to the associated values of the images in the first and the second dimensions; receiving user input for visually manipulating one of the first plurality of images displayed in the first two-dimensional image grid, the user input including one or more of zooming, panning, and thresholding; and simultaneously updating views of the first plurality of images that are visible in the first two-dimensional image grid by applying the user input to the first plurality of images.

These and other embodiments can each optionally include one or more of the following features.

In some implementations, the methods further include actions of: prior to receiving user input for visually manipulating one of the first plurality of images, displaying a second plurality of images from a second multi-dimensional dataset in a second two-dimensional image grid, wherein the simultaneous updating also updates views of each image that is visible in the second two-dimensional image grid.

In some implementations, each of the second plurality of images is associated with a respective value in each of the first and the second dimensions.

In some implementations, the methods further include actions of: displaying a table, the table comprising numeric measurement data derived from one or more of the first plurality of images; receiving user input selecting the numeric measurement data in the table; and updating the first two-dimensional image grid to visually emphasize the one or more images from which the selected numeric measurement data was derived.

In some implementations, the selected numeric measurement data is associated with an object in the one or more of the first plurality of images, and the methods further include the actions of visually emphasizing the object in the images that are visible in the first two-dimensional image grid.

In some implementations, the methods further include actions of: displaying a graph, the graph comprising data points representing numeric measurement data derived from one or more of the first plurality of images; receiving user input selecting one or more data points on the graph; and updating the first two-dimensional image grid to visually emphasize the one or more images corresponding to the selected data points.

In some implementations, the methods further include actions of: displaying a browsable image strip comprising a sequence of thumbnail images, the sequence of thumbnail images representing a sequence of values in one of the plurality of image-collection dimensions; receiving user input selecting one of the sequence of thumbnail images; and updating the first two-dimensional image grid to present a second plurality of images associated with a value represented by the selected thumbnail image in the one of the plurality of image-collection dimensions.

In some implementations, the methods further include actions of: visually manipulating the second plurality of images that are visible in the first two-dimensional image grid according to the visual manipulation that was applied to the first plurality of images.

In general, another innovative aspect of the subject matter described in this specification can be embodied in methods that include the actions of: displaying a plurality of images in a two-dimensional image grid, wherein a first and a second dimension of the two-dimensional image grid are selected from a plurality of image-collection dimensions including time, stage, channel, and focus position, wherein the plurality of images are selected from a first multi-dimensional dataset comprising images of a biological sample, each of the plurality of images being associated with a respective value in each of the first and the second dimensions, and wherein the plurality of images are associated with a common value in a third dimension selected from the plurality of image-collection dimensions and are ordered in the first two-dimensional image grid according to the associated values of the images in each of the first and the second dimensions; displaying a browsable image strip comprising a plurality of thumbnail images, the plurality of thumbnail images being derived from a first set of source images from one or more multi-dimensional datasets and representing a plurality of values in a respective image-collection dimension, the respective image-collection dimension being selected from a second plurality of image-collection dimensions including Time, Channel, Stage, Focus Position, and Data Set; receiving user input selecting one of the images displayed in the two-dimensional image grid; and updating the plurality of thumbnail images in the browsable image strip, the updated plurality of thumbnail images being derived from a second set of source images from the one or more multi-dimensional datasets, the second set of source images being different from the first set of source images, and the second set of source images being associated with the associated values of the selected image in one or more of the first and the second dimensions.

In some implementations, each of the second set of source images is associated with the associated values of the selected image in both the first and the second dimensions.

In general, another innovative aspect of the subject matter described in this specification can be embodied in methods that include the actions of: displaying a first plurality of images in a two-dimensional image grid, wherein a first and a second dimension of the two-dimensional image grid are selected from a plurality of image-collection dimensions including Time, Stage, Channel, and Focus Position, wherein the first plurality of images are selected from a first multi-dimensional dataset comprising images of a biological sample, each of the first plurality of images being associated with a respective value in the first and the second dimensions, and wherein the first plurality of images are associated with a common value in a third dimension selected from the plurality of image-collection dimensions and are ordered in the two-dimensional image grid according to the associated values of the images in each of the first and the second dimensions; displaying a browsable image strip comprising a plurality of thumbnail images, each of the plurality of thumbnail images representing a respective multi-dimensional dataset in a plurality of multi-dimensional datasets; receiving user input selecting a thumbnail image displayed in the browsable image strip, the selected thumbnail image representing a second multi-dimensional dataset, the second multi-dimensional dataset being different from the first multi-dimensional dataset; and updating the two-dimensional image grid to display a second plurality of images from the second multi-dimensional dataset, wherein the second plurality of images are associated with the associated values of the first plurality of images in the first, second, and third dimensions and are ordered in the two-dimensional image grid according to the images' associated values in each of the first and the second dimensions.

In general another innovative aspect of the subject matter described in this specification can be embodied in methods that include the actions of: displaying a first plurality of images in a two-dimensional image grid, wherein a first and a second dimension of the two-dimensional image grid are selected from a plurality of image-collection dimensions including Time, Stage, Channel, and Focus Position, wherein the first plurality of images are selected from a multi-dimensional dataset comprising images of a biological sample, each image in the first plurality of images being associated with a respective value each of the first and the second dimensions, and wherein the first plurality of images are associated with a first value in a third dimension selected from the plurality of image-collection dimensions and are ordered in the two-dimensional image grid according to the associated values of the images in each of the first and the second dimensions; displaying a browsable image strip comprising a plurality of thumbnail images, each of the plurality of thumbnail images representing a respective value in the third dimension; receiving user input selecting one of the plurality of thumbnail images displayed in the browsable image strip, the selected thumbnail image representing a second value in the third dimension, the second value being different from the first value; and updating the two-dimensional image grid to display a second plurality of images from the multi-dimensional dataset, wherein the second plurality of images are associated with the second value in the third dimension, and wherein each of the second plurality of images corresponds to one of the first plurality of images in associated values in the first and the second dimensions.

These and other embodiments can each optionally include one or more of the following features.

In some implementations, in the methods described herein, displaying images in a two-dimensional image grid further includes the actions of: generating a plurality of composite images by overlaying multiple constituent images from multiple focus positions or multiple channels, wherein each of the plurality of composite images are associated with a respective value in each of the first and the second dimensions; and displaying the plurality of composite images in the two-dimensional image grid according to the associated values of the composite images in each of the first and the second dimensions.

In some implementations, in the methods described herein, displaying images in a two-dimensional image grid further includes the actions of: generating a plurality of composite images by overlaying multiple constituent images, wherein each of the plurality of composite images are associated with a respective value in each of the first and the second dimensions, and at least one object present in one of the plurality of composite images is invisible in at least one of the multiple constituent images of the composite image; and displaying the plurality of composite images in the two-dimensional image grid according to the associated values of the composite images in each of the first and the second dimensions.

In some implementations, in the methods described herein, displaying images in the two-dimensional image grid further includes the actions of: generating a plurality of composite images by overlaying multiple constituent images from multiple channels, wherein each of the plurality of composite images are associated with a respective value in each of the first and the second dimensions, and the multiple constituent images including at least a grayscale image and a colored florescent image; displaying the plurality of composite images in the two-dimensional image grid according to the associated values of the composite images in each of the first and the second dimensions.

In some implementations, for the methods described herein, displaying images in the two-dimensional image grid further includes the actions of: generating a plurality of composite images by overlaying multiple constituent images from multiple channels or multiple focus positions, wherein each of the plurality of composite images are associated with a respective value in each of the first and the second dimensions; and displaying the plurality of composite images in the two-dimensional image grid according to the associated values of the composite images in each of the first and the second dimensions, and the methods further include the actions of: receiving user input modifying a display option for one of the multiple channels or multiple focus positions; and updating the plurality of composite images displayed in the two-dimensional image grid by independently modifying the constituent images from the one of the multiple channels or focus positions according to the modified display option.

Other embodiments of these aspects include corresponding systems, apparatus, configured to perform the actions of the methods, as well as computer programs, encoded on computer storage devices, and configured to cause computing systems to perform the actions of the methods.

Particular embodiments of the subject matter described in this specification can be implemented so as to realize one or more of the following advantages.

For example, the techniques described in this specification allow images associated with multiple dimensions to be organized in a single integrated data visualization interface. Multiple related images (either from a single dataset or from multiple related datasets or experiments) can be viewed and manipulated in a synchronous and coordinated fashion in one or more image grids. Measurement data can be correlated with images and can be presented or highlighted in tables and graphs when presented along the images. The selection and highlighting of particular measurement data corresponding to the displayed images can be accomplished automatically by the integrated data visualization tool without user interference. Furthermore, the integrated data visualization tool can anticipate a user's image viewing needs based on the known relationships between the images in the different image-collection dimensions, and accurately and efficiently cache and present the images with minimal delay. Therefore, the user can concentrate on interpreting the images and data without bearing the burden to manually select and prepare each image and data before viewing the images for interpretation and comparison. Coordinated display and manipulation of images, measurement data, and graphs can be made both within a single dataset and across multiple related datasets, depending on user preferences.

Furthermore, thumbnail navigation can be enabled by using one or more browsable image strips. Each image strip may represent one or more image-collection dimensions within a dataset or across multiple datasets or experiments. Each cell of the image strip includes a thumbnail image representing the corresponding values of the cell in the one or more image-collection dimensions. The thumbnail image can be derived from source images in the multi-dimensional dataset. The thumbnail is chosen to best represent the image serie(s) that are associated with the corresponding values of the cell in the one or more image-collection dimensions represented by the browsable image strip.

The browsable image strip allows the user to get a rough view of the images before selecting a particular image series to display in the image grid. The image strip and generation of thumbnails can be updated automatically based on the user's selection or manipulation of the images in the image grid(s). Similarly, the images in the image grid can be updated automatically based on the user's selection of thumbnails in the image strip(s). Therefore, the navigation of the images becomes more intuitive and the user does not have to spent mental energy keeping track of the structure and organization of the multi-dimensional image database.

The details of one or more embodiments of the subject matter described in this specification are set forth in the accompanying drawings and the description herein. Other features, aspects, and advantages of the subject matter will become apparent from the description, the drawings, and the claims.

BRIEF DESCRIPTION OF THE DRAWINGS

FIGS. 1A-1D illustrate series of images taken in four exemplary image-collection dimensions: Time (FIG. 1A); Z (FIG. 1B); wavelength/Channel (FIG. 1C); and Stage (FIG. 1D).

Like reference numbers and designations in the various drawings indicate like elements.

DETAILED DESCRIPTION

Multi-Dimensional Image Datasets

Figure 2:
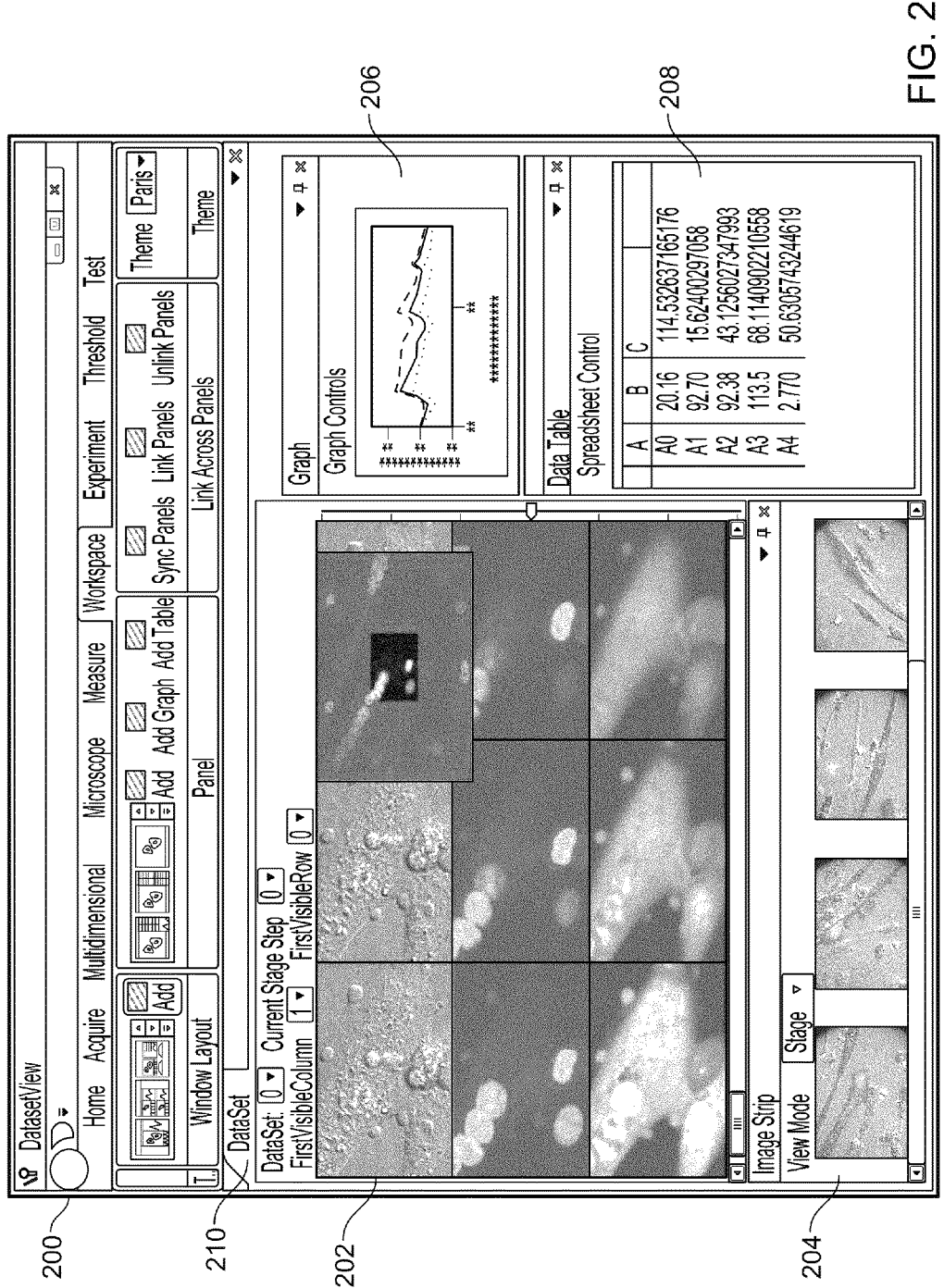
FIG. 2 shows an exemplary layout of various components of a dataset viewer in an integrated data visualization interface for use with a multi-dimensional microscopy system.

Currently available multi-dimensional microscopy systems are capable of acquiring images of an object, e.g., a biological sample, in a number of image-collection dimensions. FIGS. 1A-1D are schematics illustrating images collected in a number of such dimensions. For example, FIG. 1A shows, schematically, images (101a-e) of a cell sample taken consecutively in time. The images (101a-e) can be consecutively captured at discrete time intervals by the imaging system (e.g., in a time lapse), or collected continuously. These images form a Time series, and when presented in order, these images can reveal how the cell sample evolved or changed over time. In the Time series, each image is associated with a particular time value in a time sequence. Each multi-dimensional experiment can include multiple Time series, each associated with a different value in at least one other image-collection dimension.

FIG. 1B shows images (102a-c) of a cell sample collected at a number of focus positions along the z-axis. The z-axis is in the direction toward or away from cell sample. These images form a Z-series. The images (102a-c) in the Z-series, when presented in order, show the cross-sections of the three-dimensional cell sample along the z-axis through the biological sample. Given sufficient granularity for the progression in the z-direction, the images in the Z-series can be used to reconstruct three-dimensional views of the objects in the sample. In the Z-series, each image is associated with a particular Z-position value along the z-axis. There can be multiple Z-series in a multi-dimensional dataset, each being associated with a different value in at least one other image-collection dimension.

FIG. 1C shows images (103a-c) taken under different imaging conditions, for example at different wavelengths. There are many different techniques for imaging of a biological sample. Different biological activities or objects tend to produce different optical effects under different imaging conditions. Common imaging conditions include, for example, bright-field imaging, fluorescent imaging, imaging using transmitted light, imaging using reflected light, Differential Interference Contrast (DIC) imaging, phase contrast imaging, and so on. For fluorescent imaging, different fluorescent markers and fluorochromes can be used to tag different structures within the biological sample. Images can be collected of the different emission spectra. Different wavelengths can be used to excite the different fluorescent markers. The different imaging conditions can be used to define an image-collection dimension, namely the Channel dimension. Each of the different imaging conditions, or wavelengths, corresponds to a particular channel in the Channel dimension. Images of different channels need not be arranged in any particular order relative to one another. There can be multiple Channel series in a multi-dimensional dataset, each Channel series being associated with a particular value in at least one other image-collection dimension (e.g., the Time dimension).

In the Channel series, each image is associated with a particular imaging technique or imaging wavelength. The different images of the same biological sample taken under different imaging conditions can visually reveal or enhance different structures within the biological sample. The images in the Channel series can be stacked together to produce a composite image that provides a more complete picture of the biological sample. In some situations, the user can optionally select a subset of the images in the Channel series for making a composite that reveals only particular objects of interest in the biological sample. In some implementations, images from different channels can be enhanced and subtracted from one another to isolate particular objects of interest.

FIG. 1D shows images (104a-c) taken at different stage locations in the biological sample. Frequently, the field of view for a microscopy imaging system is smaller than the size of the biological sample to be imaged. Therefore, multiple images need to be taken at different locations over the biological sample to capture the entirety of the features of interest of the biological sample. The area (105) over the entire biological sample can be divided into sections, each section being associated with a particular stage identifier. In some examples, the images taken over each section are associated with the stage identifier of the section. Images from different stages form the Stage series, and can be stitched together to form a broader view of the biological sample. There can be multiple Stage series in a multi-dimensional dataset, each Stage series being associated with a different value in at least one other image-collection dimension (e.g., the Channel dimension).

FIGS. 1A-1D illustrate images for four example image-collection dimensions obtained from a multi-dimensional biological experiment. Other image-collection dimensions can be defined. For example, a user can define an Experiment Condition dimension, where each value in the Experiment Condition dimension represents a particular experiment condition, or combination of conditions, that is present when images are being captured. For example, suppose in an experiment, a number of different catalysts were added consecutively to a biological sample, and an image was taken after each catalyst is introduced. The set of images collected under the different combinations of catalysts can form an Experiment Condition series, and each image is associated with a particular catalyst combination within the Experiment Condition series. In some implementations, multiple images can be taken under each experiment condition (e.g., at different time points, in different channels, at different stages, etc.), and multiple Experiment Condition series can be formed, each associated with a different value in at least one of the other image-collection dimensions.

Each image-collection dimension can exist with different granularities in different datasets. For example, images can be taken more frequently (e.g., every 1 ms) in one dataset, and taken less frequently (e.g., every 10 s) in another dataset. In some cases, each image-collection dimension can have different granularities for different value intervals. For example, for the first and the last thirds of the experiment, images are taken every 10 seconds, while images are taken every 2 seconds during the middle third of the experiment. The Time-dimension for the dataset therefore shows a higher sampling frequency in the middle third section.

In a multi-dimensional experiment dataset, multiple images can be associated with each value in a particular image-collection dimension. Similarly, each image can be associated with particular values in multiple image-collection dimensions. For example, in the Time series, each time value is associated with a number of images. These images are associated with the same value in the Time dimension, but different values in at least one other dimension (e.g., different channel values, stage values, or z values).

Frequently, a one-dimensional image series can be extracted without modification from a multi-dimensional dataset. In the one-dimensional image series, each image is associated with a different value in one particular image-collection dimension, but share identical values in all other image-collection dimensions. For example, in a one-dimensional Time series, each image is associated with a different time value, while all images in the one-dimensional Time series are associated with the same stage, z, and channel values.

In some implementations, a one-dimensional image series can be derived from a multi-dimensional dataset. For example, each image in the one-dimensional image series can be a composite of multiple constituent images that are associated with a common value in one image-collection dimension but different values in at least one other image-collection dimension. For example, in a derived one-dimensional Time series, each image represents a particular time value and is a composite of multiple source images that are associated with the particular time value. Each of the multiple source images for making the composite can be a one dimensional Channel series associated with the particular time value, or a one dimensional Z-series associated with the particular time value.

Therefore, images collected in a multi-dimensional experiment can be organized in different single or multi-dimensional series depending on the viewing needs of the user. Images can be related to one another based on the associated values in each of the image-collection dimensions. For example, an image is associated with a particular channel, a particular time value, a particular focus position (i.e., Z-value), and a particular stage position. This image can therefore be related to another image that is associated with the same channel or in the same Channel series, another image with the same associated time value or in the same Time series, another image having the same focus position or in the same Z-series, or another image having the same stage position or in the same Stage series. Other image relationships by dimension can be defined.

In some implementations, multiple datasets can be collected during a multi-dimensional experiment. For example, multiple trials of an experiment can be performed on multiple samples under the same set of control conditions. Images of a particular sample taken during each trial can form a dataset. The datasets for the multiple trials in the experiment are related datasets. Similarly, one experiment can be carried out under one set of conditions, while a related experiment can be carried out under a different set of conditions. Images taken in each of the experiments can form a respective dataset, and the two datasets can be related datasets. Datasets can be related by experiment conditions, sample type, control parameters, and so on. A user of the imaging system can define each of these image organization levels (e.g., experiment, trial, or dataset) as a corresponding image-collection dimension (e.g., the Experiment, Trial, or Data Set dimensions), and relate the datasets under these different organization levels.

In interpreting the images collected in a multi-dimensional experiment, it is useful to compare and analyze images that are related (either within a dataset or across datasets) by particular dimensions (e.g., Time, Z, Channel, Stage, and so on). For example, if a first dataset contains images of a biological sample taken before a particular catalyst is injected and a second dataset contains images of an identical sample taken after the particular catalyst is injected, the Time series of the two datasets can be compared to see how the catalyst influenced the biological sample over time. Each image in the Time series in the first dataset is related to a corresponding image in the Time series in the second dataset by a common associated time value.

Each image taken in a multi-dimensional experiment may contain different objects of interest at various locations, such as particular structures, substances, artificial markers, and so on. These objects of interest can be identified using various image processing techniques. The same object can be present in multiple images, and therefore identified and tagged in each image. Due to the varying sensitivity of different imaging techniques to different objects, the same object may appear in only some of the images of the same sample. Sometimes the same object may evolve and change during the course of the experiment and exhibit different appearances, change locations, or disappear in the images. For example, images from different channels can show different cell structures of the same cell, while images from a Time series can show the progress of a cell cycle. Even though the sample is shown in each image, the objects contained in the different images may not be identical.

Post image acquisition, objects can be identified and tracked in different image series. Objects can include actual physical structures or substances in nature (e.g., a cell, a component of a cell). Regions of interest can be user-defined or application-defined, and can be tracked in different image series as well. For example, a user can select a particular region in one image, and have that region tracked in multiple images in a Time series, Z series, or Channel series. Markers (e.g., arrowheads) or other indicators (e.g., circling, highlighting, and so on) that visually identify or emphasize the objects or regions of interest can be overlaid on the images over or near the objects or regions of interest.

In addition to image data, a dataset can also include numeric measurement data. For example, measurements can be done on the images or the objects or regions of interest identified in the images. Images, objects, and measurements, can bear relationships to one another. For example, multiple images can be related to one another by common objects present in the images and/or similar measurements derived from the objects or images. Measurements derived from a particular set of images and objects can be related to the set of images and objects, and vice versa. For example, a numeric measurement derived from an image can include, for example, a cell count. The measurement (i.e., the cell count, in this example) is related to the individual cells (the objects) that are identified in the image. The individual cells may be present in multiple images, and these multiple images can be related to one another, to the individual cells, and to the numeric measurement (i.e., the cell count, in this example).

Numeric measurement data can be associated with multiple images in a single image-collection dimension, across multiple image-collection dimensions, in a single dataset, or even cross multiple datasets. Particular measurement data can be associated with a single object in a single image, multiple objects in an image, a single object in multiple images, or multiple objects in multiple images, and so on. Examples of measurement data include, size, shape, intensity, gradation, motion, speed, counts, scores, and so on. In addition to numeric measurement data, a dataset can also include other derived correlations and statistics for the images and measurements (e.g., averages of the numeric measurement data across objects, images, datasets, dimensions, and so on).

Other relationships between objects, images, and measurements can be defined, and are consistent with the technologies described herein.

Integrated Multi-Dimensional Data Visualization Interface

A vast amount of information is embedded in the images and measurements obtained from each multi-dimensional experiment. Understanding how any given image relates to another image is challenging. Extracting meaningful relationships and useful information out of the images and measurements is more challenging. An integrated data visualization interface is disclosed herein. The integrated data visualization interface exploits the relationships that are known due to the nature of the collection methods and dimensions, to assist in the presentation and navigation of images and data within relevant datasets. Many manual selection and manipulation steps can be automatically and synchronously accomplished without the user having to issue specific commands through the integrated multi-dimensional data visualization interface. Thus, the navigation and viewing of images in the integrated data visualization interface become much more efficient and intuitive compared to visualization interfaces available elsewhere.

FIG. 2 shows an exemplary layout of an integrated data visualization interface 200. In some implementations, the integrated data visualization interface 200 includes four components: an image grid 202, a browsable image strip 204, a graph component 206, and a table component 208. Not all components need to be present in the integrated data visualization interface at the same time. Not all components need to be implemented for an integrated data visualization interface to function. In some embodiments, the integrated data visualization interface 200 includes one or more dataset viewers 210. The dataset viewer 210 is a container object that can contain a group of components, such as the image grid 202, the browsable image strip 204, the graph component 206, and the table component 208. The image grid, browsable image strip, graph, and table components within each dataset viewer are used to display images and data for a single dataset. Different dataset viewers can be used to display data (images and numeric measurements) from the same dataset or different datasets. In some embodiments, multiple instances of a component (e.g., multiple image grids or multiple image strips, and so on) can be displayed in the integrated data visualization interface. For example, two image grids can be displayed in the integrated data visualization interface. In some embodiments, multiple instances of a component can exist within their respective dataset viewer windows. For example, two image grids can exist in two different dataset viewers, along with two browsable image strips. Other components and container objects can also be implemented.

In some implementations, a frequently used component, such as the image grid 202, can be used as a default component for the integrated data visualization interface 200. For example, when the user first starts the integrated data visualization interface 200, only an image grid is presented in the interface 200 (e.g., within a dataset viewer window 210 in the interface 200). The user can subsequently invoke the other components, such as the browsable image strip 204, the graph component 206, the table component 208, and so on, as desired. The user can also subsequently invoke multiple instances of each component as needed (e.g., two instances of the image grid) within the integrated data visualization interface 200 (e.g., by opening two dataset viewers 210 each containing an image grid 202, or by opening two standalone image grids).

In some implementations, no default component needs to be present in the integrated data visualization interface initially, and the user can select a desired component after the interface is activated. For example, the user can choose to invoke only the table component to view measurement data, without opening the image grid or the image strip. This option is useful when the dataset does not contain many images, and the measurement data is the primary source of information in the dataset. In some situations, image data in a dataset is compressed or archived due to its large size, and it may be more convenient for a user to view the numeric measurement data first before deciding whether to open the image data.

The layout of dataset viewer windows and the layout of display components within each dataset viewer can be varied. For example, the user can move and rearrange the different components in the dataset viewer window after the components are invoked. The different components can also be resized manually or automatically based on the content displayed within each component.

Image Grid

Figure 3A:
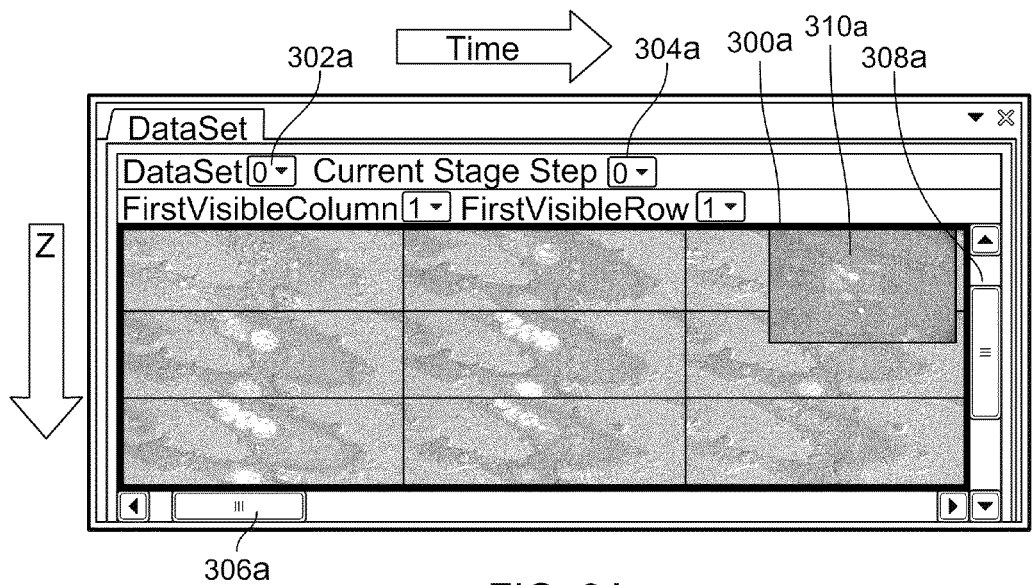
FIG. 3A shows an exemplary image grid in a Time v. Z view mode.
Figure 3B:
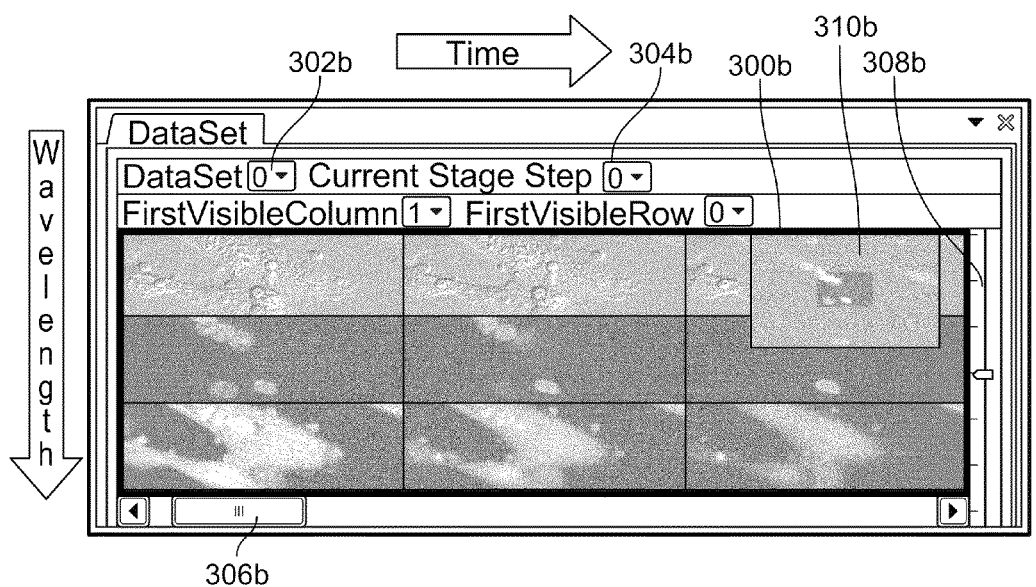
FIG. 3B shows an exemplary image grid in a Time v. Channel view mode.

A view mode, as used herein for an image grid, is defined by the one or more image-collection dimensions displayed on the grid. FIGS. 3A and 3B show an example of an image grid in two different view modes (300a and 300b). Specifically, FIG. 3A shows the image grid in a Time v. Z view mode (300a), and FIG. 3B shows the image grid in a Time v. Channel (Wavelength) view mode (300b). Other view modes are also possible. Each of the image grids is shown in a respective dataset viewer.

The image grid can display images in a selected dataset. In the examples shown in FIGS. 3A and 3B, the image grid (300a and 300b) is a two-dimensional grid and is associated with two image-collection dimensions. The columns of the image grid are associated with a series of values in a first image-collection dimension and the rows of the image grid are associated with a series of values in a second image-collection dimension. In some implementations, the image grid can also be associated with a single value in a third dimension. In some implementations, the first and the second dimensions can be identical.

Each cell of the image grid can contain an image associated with a first value in the first image-collection dimension and a second value in the second image-collection dimension of the image grid. To populate the image grid with images, the user can first select a dataset (e.g., using user interface element 302a and 302b) for the dataset viewer. The user can then specify a view mode (not shown in FIGS. 3A and 3B) for the image grid. Optionally, the user can also select the total number of rows and columns for the image grid. If the number of rows and columns are not specified, the size of the image grid can be based on the number of sampling points available in the selected dataset for the first and the second image-collection dimensions.

Each dimension of the two-dimensional image grid can represent a corresponding image-collection dimension (e.g., Time, Z, Channel, Stage, and so on). For example, in a Time v. Z mode (as shown in FIG. 3A), each row of the image grid is populated with images from a Time series that is associated with a particular value in the Z-dimension, and each column of the image grid is populated with images from a Z-series that is associated with a particular value in the Time dimension. Each image presented in a cell of the image grid is associated with the corresponding Z value and time value of that cell. Optionally, the image grid is also associated with a single value in a third image-collection dimension (e.g., Stage). As shown in FIG. 3A, the third dimension is Stage, and the associated value in the third dimension is stage value 0, as indicated by element 304a.

As shown in FIG. 3A, the images displayed in the image grid are arranged such that the focus positions (i.e., Z values) at which the images were taken are incremented in the vertical direction of the grid, and the time points at which the images were taken are incremented in the horizontal direction of the grid. In some implementations, the user can specify a coarser resolution (or step intervals) for the time grid so that only a subset of the images in the relevant image series is presented.

For another example, in a Time v. Channel view mode (as shown in FIG. 3B), each column of the image grid corresponds to a value in the Time dimension, and each row of the image grid corresponds to a value in the Channel dimension. Each image presented in a cell of the image grid is associated with a corresponding time value and a corresponding channel value for the cell. As in FIG. 3A, the image grid in FIG. 3B is also associated with a single value in the third dimension (e.g., the Stage dimension). The images in the image grid are arranged so that the images' associated time values are incremented along the horizontal direction. The values in the Channel dimension do not have any required order, and therefore can be arranged in any predetermined order in the image grid.

Other view modes can be implemented for the image grid. For example, in addition to Time v. Z, and Time v. Channel, the image grid can also be presented in a Channel v. Z mode, a Multi-Channel mode, a Multi-Time mode, or a Multi-Z mode. In cases where both the rows and the columns of the image grid represent the same image-collection dimension, the image grid can be populated row by row, or column by column, with images that are associated with incremental values in the image-collection dimension. Other alternatives, such as a Stage v. Time mode, a Stage v. Channel mode, a Stage v. Z mode, and a Multi-Stage mode can also be implemented.

View modes with other image-collection dimensions (e.g., user-defined image-collection dimensions) can also be implemented. For example, during image processing, a copy of each image in a Time series can be saved after each of a set of image processing steps, and the processing history of the images can be defined as a new image-collection dimension (e.g., the History dimension). The image processing steps can include, for example, background subtraction, pixel manipulation, thresholding (i.e., removing pixels meeting one or more thresholds from an image), sharpening, blurring, binarization, edge detection, and so on. A Time v. History view mode can be defined, where each column of the image grid displays the images from a corresponding History series that is associated with each time value in the Time dimension.

The image shown in each cell of the image grid can be a single image that is associated with the values represented by the cell in the two image-collection dimensions of the image grid. If the image grid is also associated with a value in the third image-collection dimension, the single image is also associated with that single value in the third image-collection dimension (e.g., Stage). For example, in FIG. 3B, each image is a single image associated with a single time value, a single channel value, and a single stage value.

In some implementations, each image shown in the image grid can also be a representative image or a composite image of multiple images that are associated with the same values in the first and the second dimensions of the image grid. For example, in FIG. 3A, at each time value and Z-position, images from multiple channels (e.g., the Channel series associated with the time value and Z-position) can be available in the dataset. These images from the multiple channels can be combined to produce a single composite image, and presented in a cell of the image grid. For example, the each image shown in FIG. 3A is a composite (e.g., a true color 24 bit or 48 bit image) of a Channel series that are associated with the same time value and the same Z-position.

Similarly, in FIG. 3B, at each time value and channel value, images from multiple Z-positions can be available in the dataset. Alternatively to producing a composite image (e.g., a 3 dimensional reconstruction) using the Z series to display in each cell of the image grid, a representative image can be selected or generated for display in the cell. For example, each cell of the image grid can display an image associated with a mid-point value in the Z dimension. The criteria for selecting the representative image can be provided by a user, for example, through a menu command. The criteria can also be defined by the system based on the properties of the images in each particular image-collection dimension.

In some implementations, neither composites nor representative images need to be selected or generated for display in the image grid. Instead, all images in a dimensional series (e.g., Z series, Channel series, Time series, etc.) can be presented in a cell of the image grid. Continuing with the FIG. 3B example, images in an entire Z series that are associated with a common Time value and a common Channel value can be displayed in a corresponding cell of the image grid as a cycled movie sequence. In some implementations, the movie sequence is automatically cycled through. In other implementations, the movie sequence is played, for example, when the mouse pointer is hovered over the image cell or a play control is invoked in the viewer interface.

If all the images available for an image-collection dimension cannot fit within the visible areas of the image grid, a horizontal slider (e.g., 306a and 306b) can be provided for the user to scroll through the cells in the dimension to reveal other images not currently visible. Similarly, a vertical slider (e.g., 308a and 308b) can be used to scroll through the image cells in the second dimension of the image grid. A third dimension can also be selected for the image grid (e.g., using a dropdown menu). For example, the user can select a Channel dimension or Stage dimension as the third dimension for an image grid in the Time v. Z view mode. The user can then specify a particular value for the third dimension (e.g., from a dropdown menu).

Other ways to implement the selection of view mode and the third dimension are possible and consistent with the technology described herein.

Coordinated Presentation and Manipulation of Images within an Image Grid

Images simultaneously displayed in an image grid are related in at least one image-collection dimension. Therefore, if a user visually manipulates one image in the image grid (e.g., zooming into the image, enhancing the image, or marking an object in the image, etc.), it is likely that the user would find it useful to have the same image manipulation applied to other images in the image grid as well.

The desirability of coordinated image manipulation across multiple images in the image grid may depend on the nature of the visual manipulation and the associated dimensions of the image series displayed in the image grid. For example, spatial positions in one image naturally relate to spatial positions in other images that are in the same Time, Channel, and Z series. Therefore, spatial manipulations (e.g., zoom and pan operations) applied to one image can be suitably applied to other images in the same Time, Channel, or Z series. Although applying coordinated spatial manipulations to images from different stages may not be sensible in some cases, in other cases it may still be meaningful. For example, if the sample is machine plated, samples at different stage locations resemble one another; coordinated spatial manipulation can still be meaningful.

Using the image grid shown in FIG. 3A as an example, if the user zooms into one of the images shown in the image grid 300a, all images shown in the image grid (in the Time v. Z mode) can be automatically zoomed to the same level. After the zooming, an un-zoomed image can be optionally displayed indicating the zoomed region, when the cursor, such as controlled by a track-pad or mouse, is hovered over a particular zoomed image in the image grid, for example. Similarly, if the user then pans the zoomed image to the left, all zoomed images in the image grid can be automatically panned to the left by the same amount. Subsequently, the user may restore one of the images to its original size and center, and all images in the image grid are automatically restored to their original sizes and centers as well. The automatic and synchronized application of visual manipulations across multiple images in the image grid allows the user to maintain a consistent view the images in the image grid in an effortless and error-free manner.

FIG. 3A and FIG. 3B shows an example implementation of a zoom and pan control. 310a and 310b. The zoom and pan control 310 is a semi-transparent window showing the entirety of an image that is displayed in the image grid cell underneath the semi-transparent window. The semi-transparent window includes a highlighted area indicating a section of the full image that is currently visible in the image grid cell. A user can optionally resize the highlighted area (e.g., by dragging a corner or an edge of the highlighted area) to change the current zoom level of the image grid. The resizing can be with a fixed aspect ratio or variable aspect ratio. The user can also move the highlighted area within the window (e.g., by click and drag the highlighted area within the semi-transparent window), so that the portion of the image that is visible in the image grid cell matches the highlighted section in the full image. The user can select a different image in the image grid and have the zoom and pan control display a full image of the currently selected image in the image grid.

Some image manipulations are suitable for an image in one particular dimensional series, but may not be suitable for another image in another dimensional series, even if the two images are related in one or more image-collection dimensions. For example, some visual manipulations (e.g., background subtraction, coloring based on intensity variations, etc.) are suitable for images in one dimensional series (e.g., a time series associated with a first channel value), but may not be suitable for images in another dimensional series (e.g., a time series associated with a second channel value). The image viewer can intelligently determine the appropriate set of images to which to apply the visual manipulations based on the nature of the visual manipulation and the properties of the image series.

Using the image grid 300b shown in FIG. 3B as an example, if the user specifies a background subtraction operation for one image in the second row of the image grid (i.e., the Time series that are associated with the second channel value), the same background subtraction can be automatically applied to all images in the second row, but not the images in the other rows. The reason for this selective application of the background subtraction operation is that the operation is only suitable for the images in the same channel. The background intensities for images taken from different channels are typically different because different optical conditions were used for the different channels. It would only be appropriate to apply the same background subtraction operation for images in the same channel. The selective application of the background subtraction operation is used only if the user specifies the background intensity for the channel. If a generic command is used by the user for background subtraction, and the image viewer is able to determine the appropriate background level for each channel without user input, then the background subtraction operation can be applied to all images in each channel according to the appropriate background levels for each channel.

The integrated data visualization interface can implement a variety of image display controls and operations which can be used to visually manipulate the appearance of the images in the image grid. Examples of such display controls and operations include, selection or identification of region(s) of interest (both manually or automatically detected), pseudocolor display (e.g., grayscale or color display to visualize intensity gradation in the image), image zoom and pan, intensity scales, spatial scales, calipers, overlaying object identifiers, markers or text, and so on. Invocation of each of these operations and display controls can be registered by the data visualization interface, and synchronously applied to all or a selected subset of related images within the image grid. In some implementations, the integrated data visualization interface can include a toggle button or selection menu, that allows the user to set up when and which operations are to be applied across which series of related images.

In some implementations, in addition to automatically and synchronously applying operations and visual manipulations to multiple images currently populating an image grid, previously applied operations and visual manipulations can be automatically applied to a new set of images that subsequently occupies the image grid (e.g., by replacing the original set of images). This can be done when the new set of images is related to the previous set of images in one or more image-collection dimensions. The automatic application of previous operations and visual manipulation steps to a new set of images in the image grid is a useful feature because it provides a logical continuity in the user's image viewing experience.

For example, suppose in a Time v. Z image grid, all images are associated with a first channel value. A user scrolls the image grid to reveal the images for a certain time and Z position range, and notices something of interest in those images. The user then wishes to observe the images taken from a different channel at the same time and Z position. By selecting the different channel value for the third dimension of the image grid, all the images in the image grid are replaced with images associated with the new channel value. If coordinated manipulation of images has been selected, the image grid automatically will scroll to the same section of time and Z values previously shown, such that the user can view the images without having to manually scroll through the new set of images to find the same region of interest. Because the scrolling is automatic and can happen instantly, the user can easily maintain a mental connection between the two sets of images. It is therefore easier and more efficient for the user to detect changes and connections between the two sets of images.

In addition to tracking the current scroll positions of the image grid, other user manipulations to the images can also be recorded and automatically applied to the new set of images that are subsequently displayed in the image grid. Continuing with the example described hereinabove, suppose the user also zoomed into the region of interest in one of the images before switching to the new channel value, the zoom level and the zoom location can also be recorded. When the user switches to the new channel value, the new set of images associated with the same time and Z value, but the new channel value are automatically scrolled into view in the image grid. The same manipulation, i.e., the same zoom location and zoom level can be automatically applied to the new images in the image grid.

In some implementations, the user can selectively switch on or off such automatic application of the previous operations when images in the image grid are replaced. For example, a toggle key can be used to allow the user to selectively switch on or off this function for an extended period of time. Other image processing and manipulations can be recorded and applied to the new images in the image grid as well.

In the above example, by switching the channel value, the user has not altered the view mode of the image grid, so operations (e.g., scroll, pan, zoom, etc.) that have been applied to the previous set of images in the image grid can be easily applied to the current set of images that are just loaded into the image grid.

More generally, it does not change the view mode of the image grid if the user simply specifies a new value for a dimension other than the first and the second dimensions of the image grid, even though it does change the set of images displayed in the image grid. When the view mode does not change, operations previously applied to the images in the image grid can be applied to the images subsequently occupying the image grid as well.

In some situations, the user may select a different view mode for the image grid, such that one of the two dimensions of the image grid is changed. Some of the previous operations may still be applicable and can be automatically applied to the new set of images in the image grid under the new view mode. For example, if only one of the first and second dimensions of the image grid is changed, then automatic scrolling can still be applied to the unchanged dimension. Suppose that the view mode of an image grid was originally Time versus Z, and the user has scrolled the image grid to reveal images associate with a particular time range. Further suppose that the user decides the change the view mode from Time v. Z to Time v. Channel. The image grid can be updated with a new set of images that are associated with values in the Time and Channel dimensions, and can be automatically scrolled to the time range that was previously shown in the image grid.

If the view mode of the image grid is altered such that both the first and second dimensions of the image grid are changed, then the images currently shown in the image grid are not related to the image previously shown in the image grid by any dimension. In such situations, no automatic application of previous operations or visual manipulations needs to be carried out.

Coordinated Image Presentation and Manipulation between Image Grids

Instead of operating on one image grid, the user can also open multiple image grids in the integrated data visualization interface. In some implementations, the user can open multiple dataset viewers in the integrated data visualization interface, and open an image grid within each of the dataset viewers. The image viewer can display data (images and measurement data) from the same dataset or different dataset. The view modes of the multiple image grids can be the same or different from one another. The set of images loaded in each image grid can also be the same or different from one another; or some of the images may overlap with one another.

Images in different image grids can be related by channel, by spatial positions, by time, or by the objects identified in the images, for example. The relationships can be automatically determined by the integrated data visualization interface, or be specified by the user. For example, a linking option interface can be implemented, and the user can specify, through the linking option interface, whether to link to image grids (or dataset viewers containing the image grids), and how operations applied in one image grid are to affect other image grids.

The coordinated image presentation and manipulation between two image grids that are in the same view mode are similar to that applied to images within the same image grid. For example, if two image grids are both in the Time v. Z view mode but are associated with different stage values, and the user scrolls to a particular position in one image grid and visually manipulates an image in that position, then not only is the same visual manipulation automatically and synchronously applied to all images in the same image grid, the same scrolling and visual manipulation are automatically and synchronously applied to all images in the other image grid as well.

Note however, that if an operation (e.g., a background subtraction) is suitable for only a subset of images (e.g., images in a particular channel) in the first image grid, then the operation is only applied to that subset of images in the first image grid, and to a corresponding subset of images (e.g., images in the same particular channel) in the second image grid.

If two image grids are in two different view modes, but the two view modes have least one common dimension, then some operations can be applied to both image grids for at least that common dimension. For example, if one image grid is in the Time v. Z mode, and the other image grid is in the Time v. Channel mode, if the user scrolls to a particular time value in the first image grid, the same scrolling action can be automatically and synchronously applied to the second image grid as well, such that the second image grid is also scrolled to reveal images associated with the same time value.

The multiple image grids in an integrated data visualization interface do not have to display images from the same dataset. Images from a different dataset can be displayed in each image grid. The coordinated image manipulation and visualization enable comparison of related images, both within a dataset or across multiple datasets, in a fast, easy, and efficient manner.

The user can turn the linking between image grids on or off at will. For example, if a user finds an interesting section in the time dimension in a first image grid and then opens a second image grid, and if linking was already on, the second image grid automatically scrolls to the same section in the time dimension. The user can manipulate either image grid, and have the views in both image grid update at the same time to provide an analogous view of the data in the two image grids. If the linking is off (or is turned off) when both image grids are present in the data visualization interface, for example, in two dataset viewer windows, the user can manually scroll the second image grid to a different section in the time dimension. The user can then turn on the linking After the linking is turned on, all subsequent actions applied to images in one image grid would be automatically and synchronously applied to images in the other image grid. For example if the user modifies the channels intensity scaling on one image grid it will be applied to the corresponding channel in other image grids. For another example, if the user marks an object in an image in the first image grid, the same object will be marked in other images in the same image grid, and in the images in the second image grid.

Handling of Sub-Sampled Source Images in the Image Grid

In some implementations, the image grid treats each dataset as one continuous block of data. For example, if a dataset contains 100 time points, the image grid treats the data as if there are images for all 100 time points at every stage, channel, and focus position in the dataset. In reality, some of these images may not be present. For example, some channels may be collected at a higher time frequency than others. For example, if channel 1 is collected at every time point, channel 2 may be collected only once every 10 time points. The image grid can compensate for the missing images, typically by displaying a nearby image from the dataset (e.g., an image acquired at a most close time point). For another example, images in some channels may be acquired for only a single focus position, while images in other channels are collected at multiple focus positions. When displayed in a Channel v. Z view mode, the Z dimension of the image grid may be filled by repeating images for some channels that do not have sufficient Z resolution. Other techniques for representing unavailable images may be developed. For example, interpolation between two or more nearby images can be used to generate images for a particular value that is missing from the dataset.

Display Sub-Sampling in the Image Grid

In some implementations, the images displayed in the image grid are ordered and represent evenly distributed values in the two dimensions of the image grid. For example, a time point 5 s (5 seconds) is displayed next to a time point 6 s, which is next to a time point 7 s, and so on. In some implementations, it may be desirable to have all or some sections of the grid show a coarser or finder resolution. For example, for one section of the time grid, the user can specify a 10 second resolution (or sampling interval), while for a different section of the time grid, the user can specify a 1 second resolution (or sampling interval).

In some implementations, for an image grid that only has one dimension (e.g., multi-Z, multi-Time, and so on), the resolution (or sampling rate) can be specified in either the horizontal direction, the vertical direction, or both. For example, for a multi-Time image grid, in the horizontal direction, the resolution can be every 1 second, and in the vertical dimension the resolution can be every 100 seconds. So the adjacent images in each row were taken 1 second apart in time, while the adjacent images in each column were taken 100 seconds apart. This arrangement is useful, for example, when the user wishes to skip a big section of image data that shows slow variations.

The image grid can provide easily accessible options to give the user better views of the image data. For example, a toggle button can be implemented for the user to switch between a single image view and multiple image view. A control button can be implemented to maximize a selected image or the image grid, such that the selected image or the image grid fills the screen. In some implementations, the image grid can also go into a movie mode such that images in each dimension of the image grid are played in a movie sequence.

Predictive Caching to Improve Responsiveness of the Image Grid

The number of images collected in a multi-dimensional experiment can be rather large, sometimes in the tens of thousands, or more. Such large numbers of images may easily exceed available RAM on a currently available computer system. However, retrieving images from a file system is often slow and impedes the user from moving smoothly through the data. The image grid alleviates these issues by anticipatorily caching some images based on a prediction on when these images will likely be accessed or manipulated.

First, the image grid does not load all images from the dataset into memory. Second, the image grid selectively pre-loads only images that are likely to be displayed soon. The integrated data visualization interface determines the images that the user is likely to view next based on the current state of the image grid, and the history of the user actions. For example, if the user is scrolling to the right in the Time dimension, then images for the later time points can be pre-loaded. In another example, if the user is changing the value of the third dimension of the image grid incrementally, then images associated with the next value in the third dimension can be preloaded. Furthermore, if the user is viewing images within a particular range in the image grid, then other images associated with the same range can be preloaded. User behavior can be analyzed based on past action histories to improve the accuracy of the predictions. For example, a pattern can be identified based on the past action histories in terms of repeated sequence of viewing options (e.g., view modes) the user has selected in the past, and/or the most frequently accessed datasets or image series, images or image series that are frequently accessed can be cached or preloaded. Various data analysis methods, such as machine-learning techniques, statistical analysis, heuristics, neural-network analysis and so on, can be utilized to identify patterns in user actions to determine the user's likely viewing needs and use the determined viewing needs as the basis for the caching and preloading of images in anticipation of such viewing needs.

Display of Large images

It is easy to create single or composite images that are hundreds of megabytes in size through slide scanning and image stitching techniques. Sometimes, individual large images in the dataset can exceed the available RAM of the system. If this happens, the image grid can show a sub-sampled or compressed set of pixels of the large images, and store in VRAM and RAM only those pixels that are needed for display. After the sub-sampled image is displayed in the image grid, the user can then select a portion of the image for full scale display or for generation of a new dataset to be used for display and analysis.

One technique is to automatically adjust the number of pixels and then sample the image based on the zoom factor and the memory available. As the user adjusts the zoom, or position of the view, new pixel data will be loaded for the display as necessary. In this way, no new data set needs to be created but full resolution images are available for viewing.

Another technique is to treat the large image as a stage series composed of smaller images in a grid arrangement. As data is loaded from the file the appropriate selection is loaded into RAM. Only the loaded portion is used for display and analysis. This prevents memory limitations from interfering with both display and analysis.

Navigation Image Strip

The integrated data visualization interface can include a second component for navigating the images in a multi-dimensional experiment database. This navigation component can be implemented in the form of one or more browsable image strips. An image strip can be a one-dimensional strip or a two-dimensional grid. A one-dimensional image strip can represent values in a single image-collection dimension. This image-collection dimension can include, for example, an Experiment dimension, a Data Set dimension, a Stage dimension, a Channel dimension, a Z-dimension, a Time dimension, or other user or system defined dimensions (e.g., a History Dimension, an Experiment Condition dimension). Each cell of the image strip represents a value in the associated image-collection dimension of the image strip.

The associated image-collection dimension of an image strip can be an image-collection dimension within a dataset, or an image-collection dimension going beyond a particular dataset. For example, an image strip can represent a Data Set dimension, and each cell of the image strip represents a different dataset. In another example, an image strip can represent an Experiment dimension, and each cell of the image strip can represent datasets from a different Experiment. In some implementations, each level of a hierarchical file system for storing the multi-dimensional image data can be associated with a browsable image strip, and each cell of the image strip can represent a data entity (e.g., dataset, image series, or image, etc.) on that level.

Each cell of the image strip can include a thumbnail image. Thumbnails are reduced-size versions of images, used to help in recognizing and organizing the images, for example. The thumbnail image can be a representative or composite of multiple source images. For each thumbnail, the source images are all associated with the value represented by the cell holding the thumbnail.

For example, in a Time image strip, each cell of the image strip represents a particular time value and contains a thumbnail image representing that time value. The thumbnail image can be a representative image (e.g., image associated with a mid-point value) selected from, for example, a Z series associated with the time value. Alternatively, the thumbnail image can be a composite (e.g., a full color image) of the Channel series associated with the time value.

In another example, in a Channel image strip, each cell of the image strip represents a particular channel value and contains a thumbnail image representing that channel value. The thumbnail can be a representative image selected from, for example, a Z series or a Time series that is associated with the particular channel value. Alternatively, the thumbnail image can be a composite (e.g., a 3D reconstruction) of the Z series associated with the particular channel value. Alternatively, the thumbnail can be the Time series or Z series being displayed consecutively in the cell. The thumbnail images provide visual clues as to the images associated with a particular value in a given dimension, and therefore help the user to locate the relevant image data in a database quickly.

Figure 4:
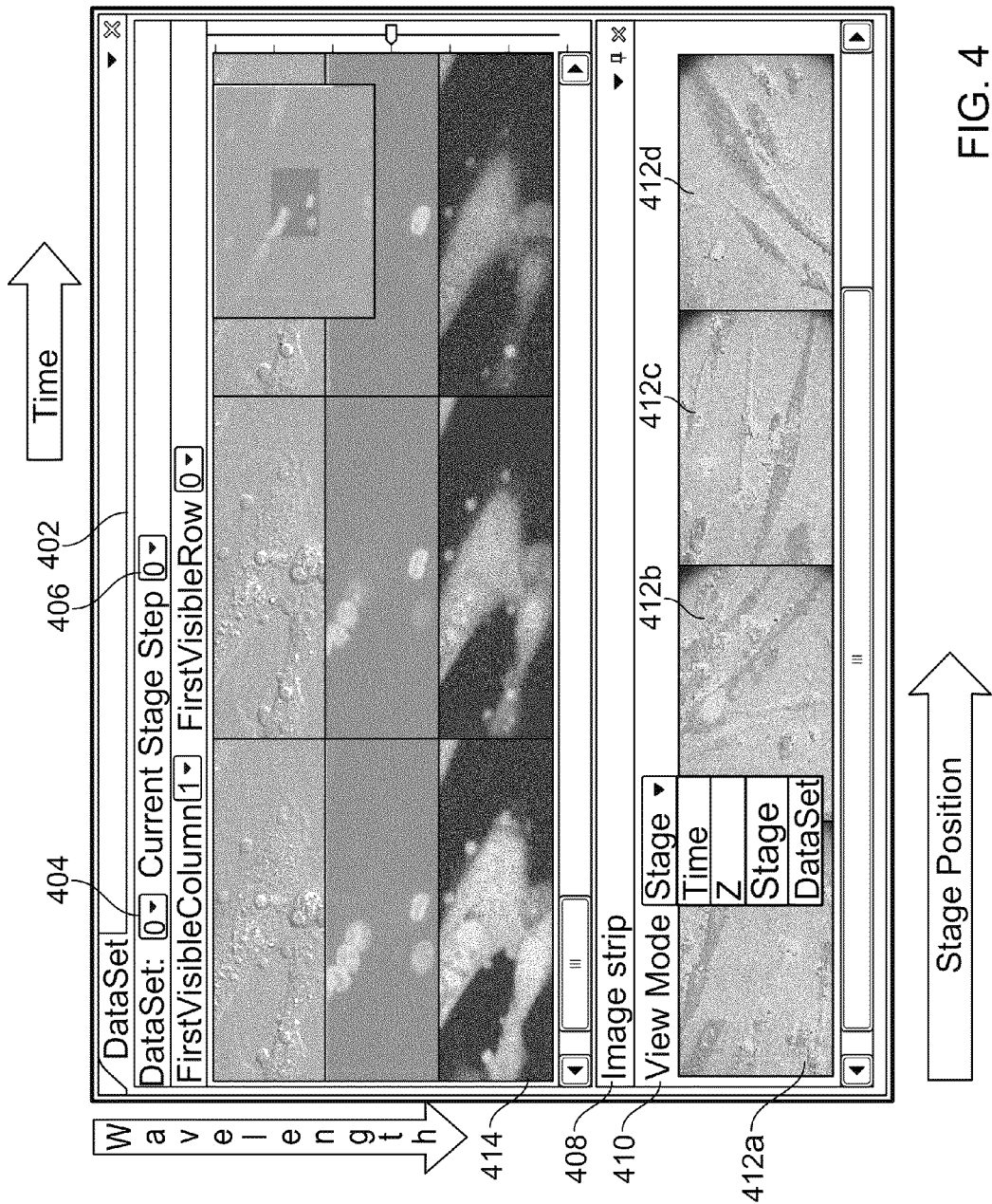
FIG. 4 shows an exemplary image strip for image navigation in a Stage dimension.

FIG. 4 shows an example image strip 408 in the integrated data visualization interface. In particular implementations, the integrated data visualization interface includes a dataset viewer 402, and the dataset viewer 402 includes an image grid 414 and the image strip 408. The image strip 408 is associated with a view mode selection element 410 which allows the user to specify the associated dimensions of the image strip. In this particular example, only four options are provided: Stage, Time, Z, and Data Set. The currently selected dimension for the image strip 408 is Stage, and therefore, each thumbnail shown in the image strip represents a particular stage position in the currently selected experiment and dataset. In this case, each thumbnail (412a-d) is a composite image of a Channel series associated with the particular stage position represented by the thumbnail. The user can select a different dimension (e.g., the Data Set dimension, or the Time dimension, etc.) for the image strip, and all the thumbnails in the image strip 408 will be replaced by the thumbnails representing values in the newly selected dimension.

In some implementations, the browsable image strip can be a two dimensional grid resembling the image grid under different view modes. For example, a Time v. Z image strip allows easy navigation within both the Time and the Z dimensions. In another example, a Channel v. Experiment image strip allows navigation in both the Channel dimension and the Experiment dimension. The user selecting a thumbnail in the Channel v. Experiment image strip can quickly located all the images associated with a particular channel within a particular experiment.

In some implementations, the browsable image strip can be a two dimensional grid representing stage positions, such that the image are arranged to reflect the spatial arrangement of the stage location. For example, if an image (A) is collected at a stage position to the right of another image (B), A will appear to the right of B in the browsable image strip. In some cases the images are collected in a grid arrangement and so the browsable image strip can represent this arrangement.

Other two-dimensional image strips include, for example, a Data Set v. Experiment image strip, a Data Set v. Stage image strip, a Data Set v. Time image strip, a Data Set v. Z image strip, a Stage v. Time image strip, a Stage v. Z image strip, a Stage v. Channel image strip, a Time v. Z image strip, a Channel v. Time image strip, a Z image strip, a Z v. Channel image strip, a Channel image strip, as well as others not specifically called out herein.

Coordinated Interaction between Image Grid and Image Strip

The image strip can be used to select images to display in the image grid that is shown in the same dataset viewer. The effect of the selection may be different depending on the view mode and other associated image-collection dimensions of the image grid.

If the selected thumbnail represents a value in an image-collection dimension other than the first and the second dimensions of the image grid, all images in the image grid are replaced with images associated with the selected value. For example, if the image grid is in a Channel v. Z view mode, and the image grid is associated with a particular time value in a third dimension, when a user selects a thumbnail in the Time image strip, the image grid is updated such that images from the Channel and Z series that are associated with the newly selected time value would populate the image grid. In another example, for the same Channel v. Z image grid, if the user selects a thumbnail in the Data Set image strip, the image grid is updated such that images from the Channel and Z series in the newly selected dataset would populate the image grid.

If the selected thumbnail represents a value in an image-collection dimension that is also the first or the second dimension of the image grid, then the image grid is simply scrolled such that the images associated with the selected value become visible in the image grid. For example, for a Channel v. Z time grid that is associated with a particular time value in the third dimension, if the user selects a particular channel value in a Channel image strip, the image grid automatically scrolls horizontally such that the images associated with the selected channel value become visible in the image grid.

In some implementations, the selection of an image in the image strip may not cause any immediate change in the image grid. A user may be required to use a particular manner of selection (e.g., double click, or hold down a hot key, or invoke a menu option) to affect the image grid. The updating of the image grid due to the selection in the image strip may be further accompanied by the updating to the graphs and the tables displayed alongside the image grid, and which are further described elsewhere herein.

The selection of thumbnails in the image strips can affect the display of images in the image grid. Similarly, selection of an image in the image grid may cause changes in the image strips as well. In order to provide image navigation that is relevant under the circumstances, the thumbnail images in the image strip can be tailored according to the images shown or selected in the image grid.

Suppose that a dataset viewer currently displays a Z image strip and a Channel v. Z image grid. Further suppose that the Channel v. Z image grid is associated with a particular time value in a third dimension. The images currently displayed in the image grid in the dataset viewer are therefore from the Z and Channel series that are associated with the particular time value. In this case, the thumbnail images in the Z image strip can be derived from source images that are associated with the same time value specified for the third dimension of the image grid. If the user decides to select a different time value for the third dimension of the image grid, a new set of thumbnail images can be derived from source images that are associated with the newly selected time value. This change in thumbnail images is helpful for a user to better navigate within the images that are of interest to him or her at the time.

In another example, if the dataset viewer includes a Z image strip and a Time v. Channel image grid, and if the user selects a particular image in the image grid, the thumbnails in the Z image strip can be updated such that they are derived from source images that are associated with the currently selected time value.

Other ways of coordinating the image grid and the image strip within the same dataset viewer can be implemented. Presentation of images in the image grid and presentation of thumbnails in the image strip are coordinated based on their connections in terms of common dimensions and common values in one or more dimensions. The coordinated presentation of images and thumbnails allows the user to have easy access to the most relevant set of images as anticipated by the integrated data visualization interface.

Generation of Thumbnail Images

There are several methods for providing a thumbnail to represent a large number of images, such as a single thumbnail to represent an entire dataset in a Data Set image strip. The methods used can include, for example, dimensional compression, determining a predictive representative, obtaining a calculated representative, user selection, or a combination of one or more of these methods.

The dimensional compression method can be used in the display of images in the image grid as well. For example, for a Time image strip, each thumbnail can be derived from multiple source images in the Channels and/or the Z series that are associated a particular time value. Each thumbnail can therefore be a full color composite image showing visual information from all channels, or a three-dimensional reconstruction showing visual information from all focus positions.

The predictive representative method can be implemented, for example, by choosing a source image that the user is likely to find relevant under the circumstance to represent a value in a given image-collection dimension. For example, multiple images in the Z-series can be associated with a particular time value, and the image that is associated with the mid-value in the Z-dimension can be selected as a representative because the image is likely to give the most complete picture of the sample as compared to other images. In some implementations, the user can define which image in a given dimension is likely to be the best representative. For example, the user can specify a particular time value that he or she is interested in, and have thumbnails in all image strips (other than the image strips having Time as one of its dimensions) be based on source images associated with that particular time value.

In some implementations, the predictive representative can be selected based on the associated values of the currently displayed images in the image grid. For example, if all images displayed in the image grid are from a particular channel (e.g., the image grid is associated with a particular channel in a third dimension), it is likely that the user is interested in seeing images from that particular channel at the moment when navigating through the dataset. Therefore, the thumbnails in the image strips (other than the image strips having Channel as one of its dimensions) can be derived from source images that are associated with that particular channel. If the user subsequently changes the view mode and/or the third dimension, the thumbnails in the image strips can be changed correspondingly.

In some implementations, the predictive representative can be selected based on the associated values of the currently selected image in the image grid. For example, if the currently selected image in a Time v. Channel image grid is associated with a particular Z value in the third dimension, the Time image strip can be populated with thumbnails that are derived from source images associated with the selected Channel value or Z value, the Channel film strip can be populated with thumbnails that are derived from source images that are associated with the selected time or Z value, the Z image strip can be populated with thumbnails that are derived from images that are associated with the selected time or channel value, and so on.

In some implementations, if multiple sources images meet the criteria for a predictive representative, other criteria for selecting the representative can be applied to select a particular predictive representative to be presented in the image strip.

The calculated representative method can be implemented by, for example, using image content to automatically score the image for fitness as a representative. Some example measures of image content can be the amount of contrast in the image, the amount of high frequency information in the image, the total brightness of the image, and so on.

A user-selected representative method can also be implemented by, for example, allowing the user to tag or select a particular image in each image series or multiple series as the representative. The user-selected representative method can also allow a user to select a representative for one cell of an image strip, and have the integrated data visualization interface automatically select images with similar qualities as the representative for the other cells in the image strip.

The representative selection methods can be combined in generating the thumbnails for the image strips. Alternatively, different representative selection methods can be applied to different image strips depending on the particular image-collection dimensions represented by the image strip. For example, the representative in the Channel image strip can be a composite or overlay of multiple channels, and the representative in the Time image strip can be calculated based on intensity, for example.

Coordinated Interaction between Image Strips

In some implementations, multiple image strips can be present in a dataset viewer window. For example, one image strip can represent the Time dimension, and another image strip can represent the Z dimension, in an experiment. In some implementations, the image strips concurrently displayed can be correlated to one another. For example, a first image strip can represent a Data Set dimension, and a second image strip can represent a secondary dimension such as the Stage dimension. If the user selects a thumbnail in the Data Set film strip, the thumbnails in the Stage image strip can be updated, where the new thumbnails in the Stage image strip are derived from source images in the dataset represented by the selected thumbnail in the Data Set image strip. In addition, if the initially selected dataset has images associate with 10 different stages, 10 thumbnails can be shown in the Stage image strip. When the user selects a different dataset in the Data Set image strip, which only has images associated with 5 different stages, the Stage image strip can be updated to show only 5 thumbnails representing the 5 different stages in the currently selected dataset.

Display Controls for Image Strips

Typically, the image strips have a reduced set of control or display options relative to the image grids. This would help avoiding clutter on a computer screen. However, in some implementations, it may be desirable to provide some display controls for the image strip as well. For example, in some implementations, the thumbnails can show the full extent of the source images. In some implementations, a zoom control is available to allow the user to zoom into a particular thumbnail (or cause coordinated zooming into all thumbnails) when the thumbnails are too small to view.

In some implementations, navigation within a thumbnail is enabled. For example, if there is a different Time series corresponding to each Z position in the dataset, the Z image strip includes a thumbnail from each Z position. The user can click on each thumbnail and see the entire Time series associated with that Z position cycle in the thumbnail. Alternatively, when the user clicks on the thumbnail, the thumbnail can be expanded to show each image in the Time series associated with the Z position. In some implementations, the thumbnail can include a play button which the user can invoke to see the Time series play as a movie sequence within the thumbnail.

Similar to the image grid, the image strips can also implement a caching mechanism to prepare or load thumbnail images in anticipation of likely user actions.

Graph and Table Components

The integrated data visualization interface can also provide a table component and a graph component tool to display numeric measurement data in the dataset. These components can be included with an image grid and/or an image strip in a dataset viewer to display data from a single dataset. These components can be selectively and independently turned on or off. The table and graph components can contain many common features and controls that exist in data management applications used elsewhere, such as spreadsheet functionality. The graph component can provide display formats including but not limited to line plots, scattered plots, bar charts, pie charts, histograms, and so on. The table components can display and manipulate tables of numeric measurement data based on user specification.

The integrated data visualization interface has access to the data organization schemes and understands the sources of the measurement data. Thus, the data displayed by the graph and the table components can be correlated with images and thumbnails displayed or selected in the image grids and the image strips. For example, the table component can show measurement data (e.g., intensity) from all images in the Z-series associated with a particular time value, or images from all Z-series regardless of associated time value. The table can also display statistics of the numeric measurement data (e.g., the distribution of the intensity values among the Z series images). The graph component can likewise plot correlations between numeric measurement data and numeric measurement data against values in various image-collection dimensions.

Multiple measurement sets can be generated from the same dataset. The measurement set can be derived from a single image, a set of images, the entire dataset, a subsection of the dataset, an entire experiment, and so on. Each measurement set is associated with a distinct set of objects and images. Keeping the clear association between measurement set, images, and objects minimizes confusion over which data is being displayed and provides for a clear interaction model within the dataset viewer. The user is thereby assured that the information displayed in every viewer components correspond to one another.

Coordinated Interaction between Table, Graph, and Image Grid

The integrated data visualization interface provides a comprehensive interactive system of viewing and navigating data within a multi-dimensional experiment or multiple related experiments. Once measurements have been made on an image set, the regions of interest/object locations of the measurement are typically known. The source images for the measurement data are also known. This allows the numeric and the image data to respond to user input in concert with one another.

The numeric display components (e.g., the table and graph components), in a similar fashion as the image grid and the image strip, can be restricted to display data of the current dataset as selected in the dataset viewer containing the numeric display components. The user can use a numeric display component (e.g., the table or the graph) to select or highlight a particular measurement. The selected or highlighted measurement can be used to adjust the image grid and/or the image strip to display images from which the measurements were made. This can be done without changing the view mode of the image displays.

Figure 5:
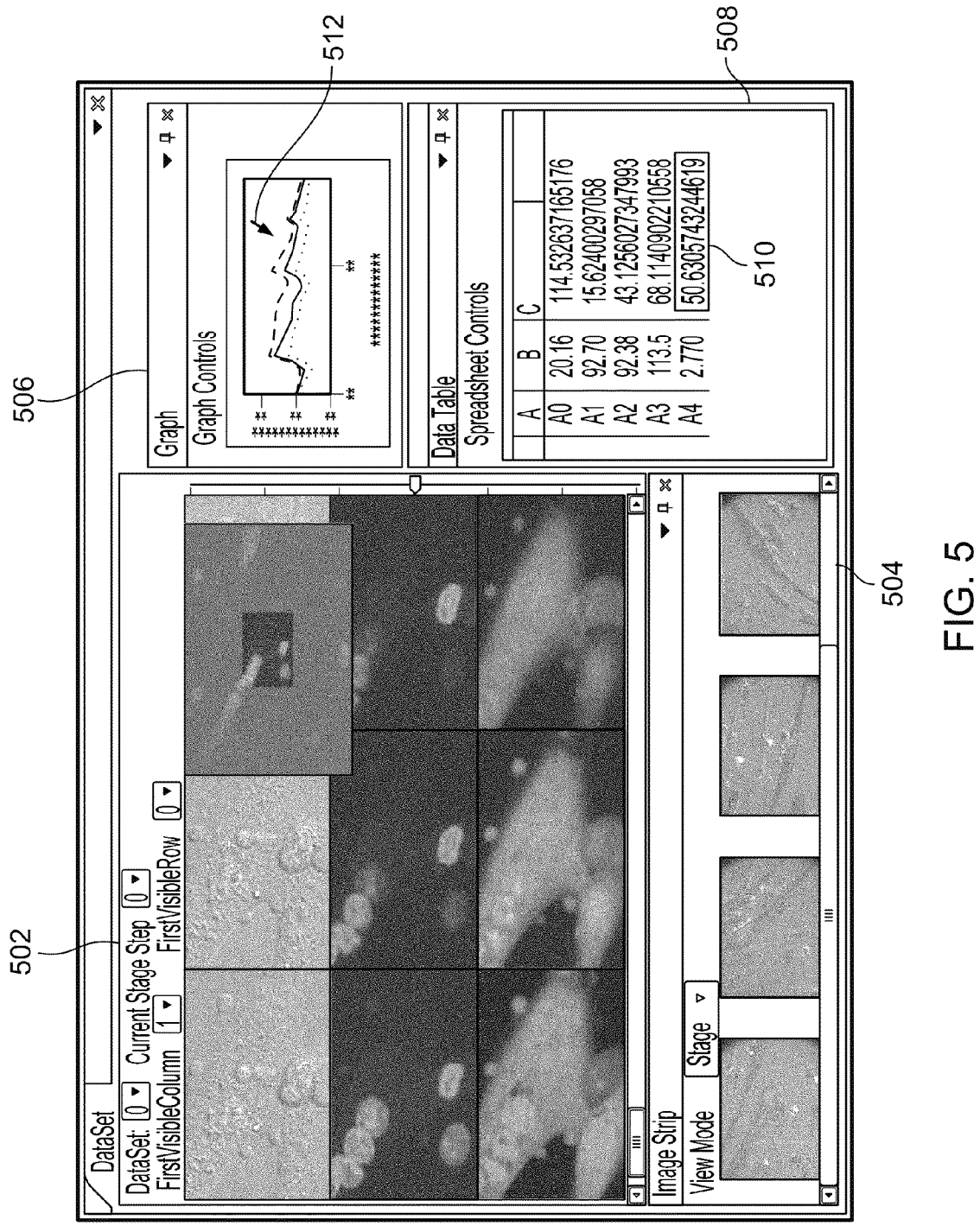
FIG. 5 is an exemplary dataset viewer showing a table component and a graph component presented along with an image grid and an image strip.

In the example dataset viewer shown in FIG. 5, a table component 508 and a graph component 506 are displayed alongside an image grid 502 and an image strip 504. When a user selects measurement data 510 in the table 508, this selection can in turn cause the image grid to display the source image(s) for the measurement or highlight the specific object or pixels used to derive the measurement. Similarly, the corresponding data point(s) in the graph 506 can also be highlighted (e.g., by a marker 512).

Likewise, the graph 506 can be used to select points and objects which are in turn displayed or highlighted in the image grid 502 and in the table 504. Similarly, the image grid can also be the input point. For example, selecting an object in an image in the image grid can cause the measurements of the object to be highlighted in the table and/or graph. The highlighted items may be one or more rows and/or columns in the table, or one or more points, lines, histogram bins, or bars in the graph, for example.

The graph and the table can be configured to display data that are only calculated from the images currently displayed in the image grid. In some implementations, the graph and the table can also be configured to display data calculated from a larger section of the dataset. These larger sections may include, for example, the entire dataset or some smaller sections of the data set.

Coordinated Interaction between Dataset Viewers

As discussed with respect to the coordinated interactions across multiple image grids, selection and manipulation of image and measurement data can be synchronized and/or coordinated across multiple dataset viewers containing the multiple image grids.

For example, a first dataset viewer includes a first image grid showing a Time series from a first dataset; and a second dataset viewer includes a second image grid showing a Time series from a second dataset. As the user scrolls, zooms, pans, or applies various image processing operations to the images in the first image grid, the same scrolling, zooming, panning, and image processing operations can be synchronously applied to the images in the second image grid as well.

For another example, each dataset viewer can further include an image strip, a graph component, and a table component. Supposed the user selects a measurement data shown in the table component in the first dataset viewer, the image grid in the first dataset viewer can be updated to show images from which the selected measurement data has been derived, the graph component in the first dataset viewer can be updated to highlight the selected measurement data, and the image strip in the first dataset viewer can be updated to show the thumbnails related to the images from which the numeric measurement data was derived. In addition to the coordinated interaction within the first dataset viewer, the image grid, the graph component, the table component, and the image strip in the second dataset viewer can be updated accordingly as well. For example, the image grid can be updated to show related images of the images currently shown in the image grid in the first dataset viewer, and the film strip, the graph component, and the table component can be updated accordingly to reflect the changes in the image grid in the second dataset viewer. Other modes of interactions between dataset viewers are possible.

Figure 6A:
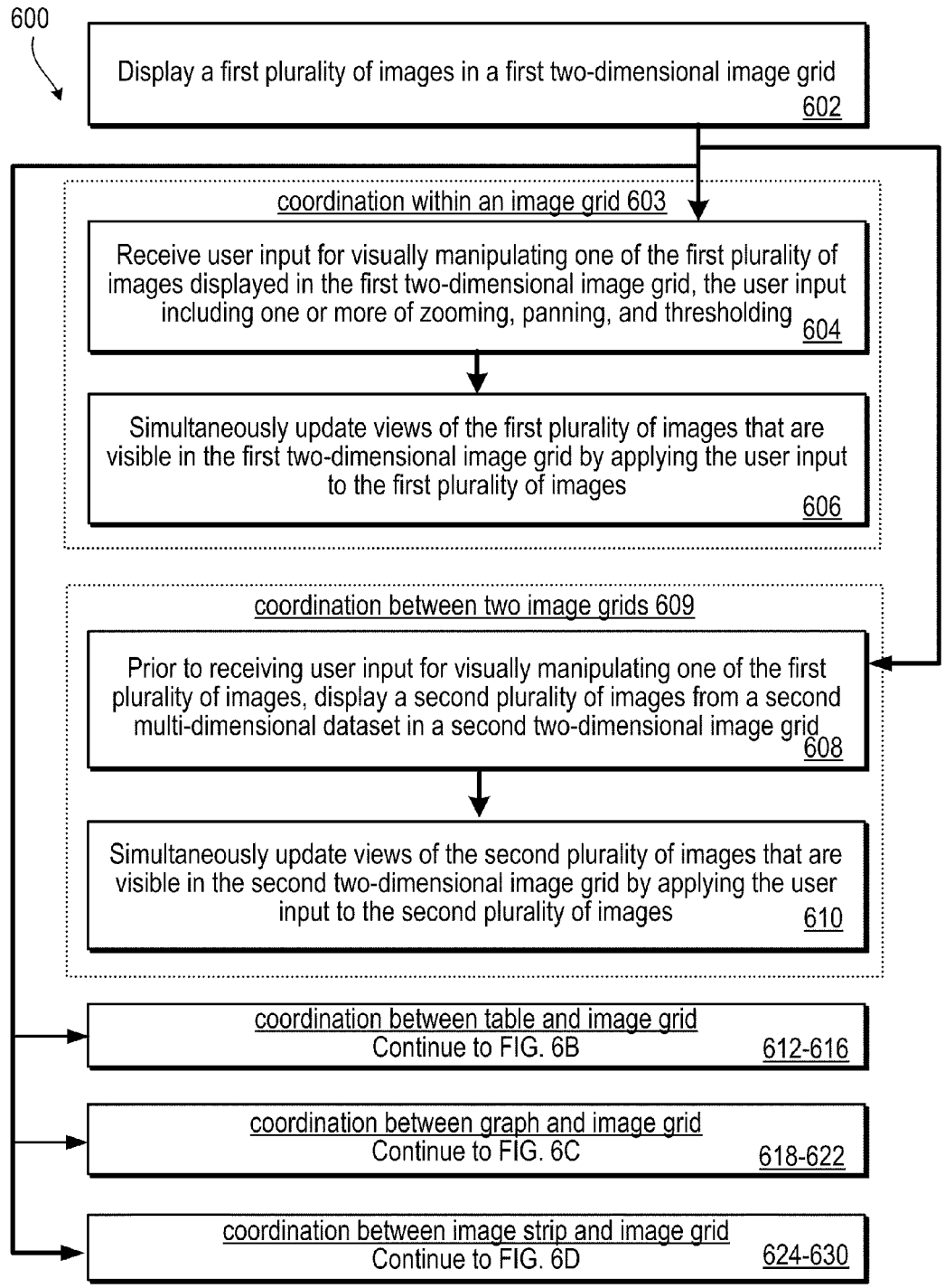
FIGS. 6A-6D are flow diagrams of exemplary processes for coordinated manipulation of related images and/or data within an image grid or multiple image grids (FIG. 6A), between an image grid and a table (FIG. 6B), between an image grid and a graph (FIG. 6C), and between an image grid and an image strip (FIG. 6D).
Figure 6B:
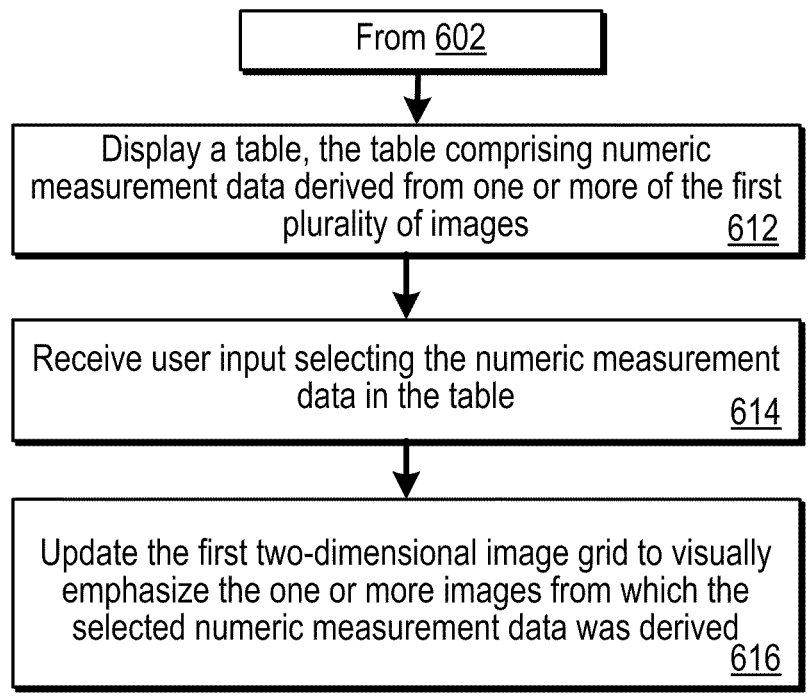
Figure 6C:
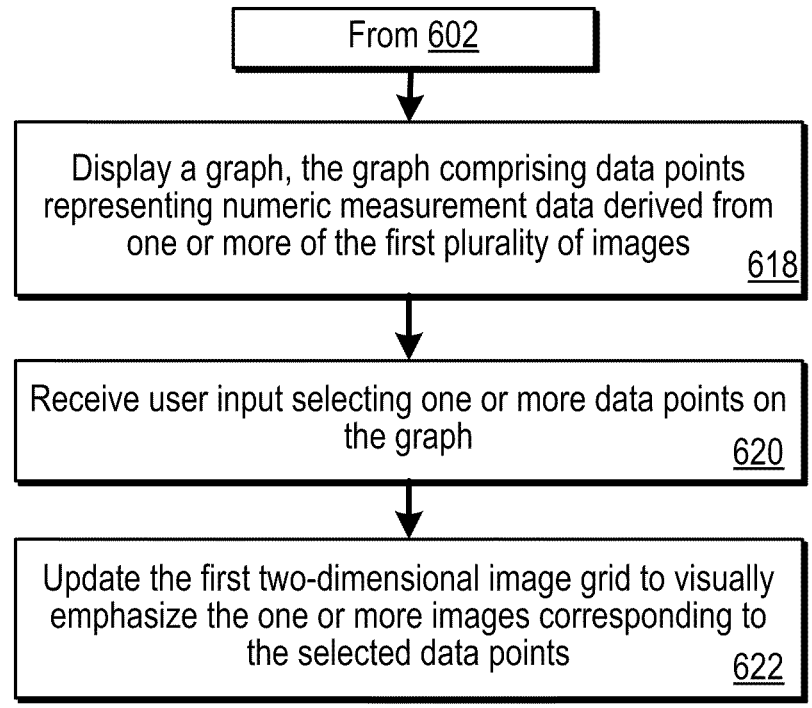
Figure 6D:
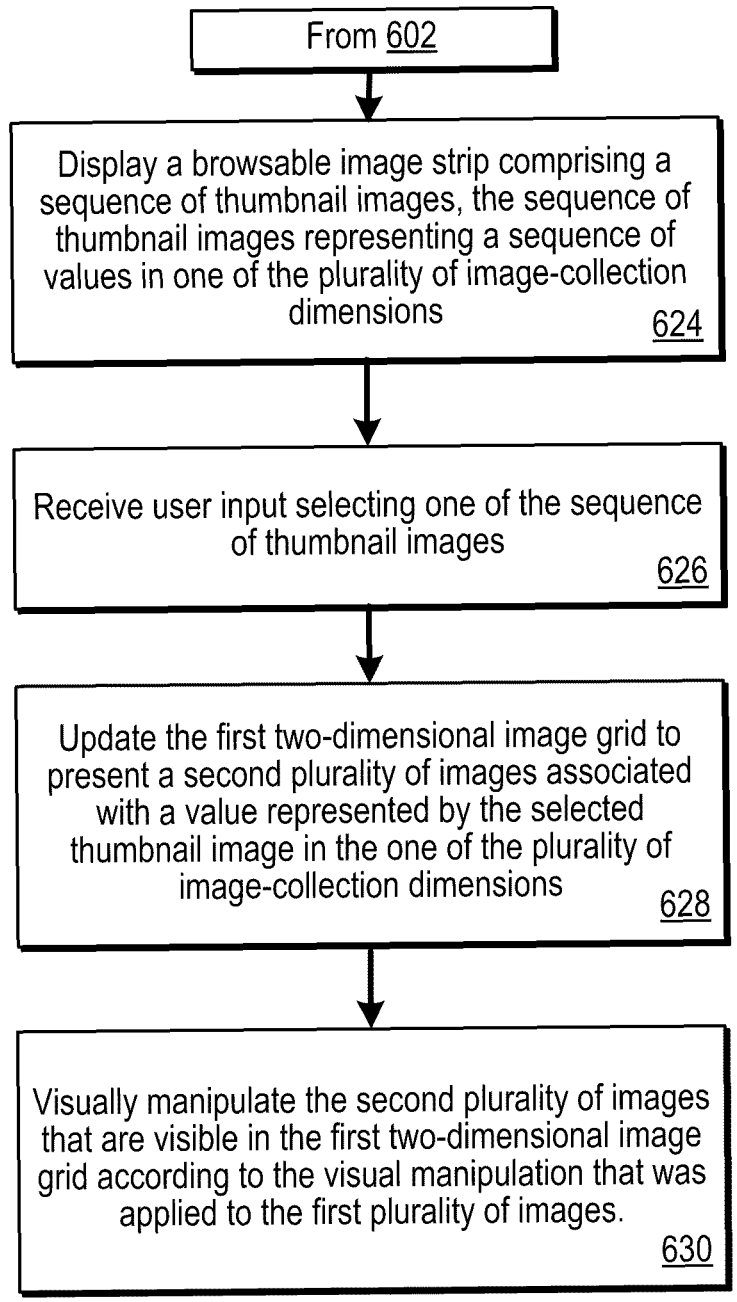

Example Processes for Implementing the Coordinated Interaction between Image Grids FIG. 6A-6D show a flowchart of an exemplary process 600 for coordinated presentation and manipulation of images and data between various components of an integrated data visualization interface as shown elsewhere herein. FIG. 6A shows how the coordinated presentation and manipulation within an image grid (shown within the dashed box 603) or across multiple image grids (shown within the dashed box 609) can be accomplished. FIG. 6B shows the coordination of interactions between a table and an image grid in a dataset viewer. FIG. 6C shows the coordination of interactions between a graph and an image grid in a dataset viewer. FIG. 6D shows the coordination of interactions between an image strip and an image grid in a dataset viewer.

The exemplary process 600 starts when a first plurality of images are displayed in a first two-dimensional image grid, at 602. The first two-dimensional image grid is in a view mode that is defined by a first dimension and a second dimension. The first dimension and the second dimension are selected from a number of image-collection dimensions, such as Time, Stage, Channel, and Focus Position (Z). Other image-collection dimensions may be defined as well, as described elsewhere herein.

The first plurality of images displayed in the image grid can be selected from a first multi-dimensional dataset, where the dataset includes images of a biological sample taken during a multi-dimensional experiment. Each image in the first plurality of images is associated with a respective value in each of the first and the second dimensions. For example, in a Time v. Z image grid, the first image-collection dimension is Time and the second image-collection dimension is Focus Position (Z). Each cell of the image grid represents a particular time value and a particular Z value. Each image displayed in the image grid is associated with the particular time value and the particular Z value represent by the cell in which the image is placed. All the images are ordered in the first two-dimensional image grid according to the associated values of the images in the first and the second dimensions of the image grid. The image grid can also be associated with a particular value in a third dimension, and each of the first plurality of images is also associated with that particular value in the third dimension. This third dimension can also be selected from the plurality of image-collection dimensions (e.g., Time, Stage, Channel, and Z).

After the first plurality of images are displayed in the first two-dimensional image grid, user input is received for visually manipulating one of the first plurality of images displayed in the first two-dimensional image grid (604). The user input can include one or more of zooming and panning The user input can also include one or more other visual manipulation operations, such as thresholding, enhancing, object identification and marking, background subtraction, linear scaling, and so on.

Once the user input directed to one image is received, views of the first plurality of images that are visible in the first two-dimensional image grid are simultaneously updated by applying the user input to the first plurality of images (606). The simultaneous application of the visual manipulation helps maintain a consistent view of the image grid as a user continues to manipulate an image, but does not require the user to manually keep track of the changes in each image.

In addition to simultaneous update of multiple images within a single image grid, the coordinated and synchronous updates can be applied to images across multiple image grids as well. In some implementations, prior to receiving user input for visually manipulating one of the first plurality of images, a second plurality of images from a second multi-dimensional dataset is displayed in a second two-dimensional image grid (608). The second multi-dimensional dataset can be the same as the first multi-dimensional dataset. The second multi-dimensional dataset can also be different from the first multi-dimensional dataset.

When the user input for visually manipulating an image in the first image grid is received and simultaneously applied to the visible images in the first two-dimensional image grid, the same visual manipulation can also be applied to the visible images in the second two-dimensional image grid, such that views of each image that is visible in the second two-dimensional image grid are also updated (610). In some implementations, the first multi-dimensional image grid and the second multi-dimensional image grid are associated with the same first and second image-collection dimensions, and each of the second plurality of images is associated with a respective value in each of the first and the second dimensions.

In some implementations, after the first plurality of images is displayed in the first two-dimensional image grid (602), a table can be displayed along with the first two-dimensional image grid (612 in FIG. 6B). The table can include numeric measurement data derived from one or more of the first plurality of images. User input selecting the numeric measurement data in the table can be received (614). After the user input is received, the first two-dimensional image grid can be updated to visually emphasize the one or more images from which the selected numeric measurement data was derived (616). In some implementations, if the one or more images were not previously visible in the first two-dimensional image grid, the one or more images are scrolled into view in the image grid. In some implementations, the selected numeric measurement data is associated with an object in the one or more of the first plurality of images, and the object can be visually emphasized in the images visible in the first two-dimensional image grid after the user input is received.

In some implementations, after the first plurality of images are displayed in the first two-dimensional image grid (602), a graph is displayed (see 618 in FIG. 6C). The graph includes data points representing numeric measurement data derived from one or more of the first plurality of images. User input selecting one or more data points on the graph can be received (620). After the user input is received, the first two-dimensional image grid can be updated to visually emphasize the one or more images corresponding to the selected data points (622).

In some implementations, a browsable image strip can be displayed along with the first two-dimensional image grid in a dataset viewer (624, in FIG. 6D). The image strip includes a sequence of thumbnail images. The sequence of thumbnail images represents a sequence of values in one of the plurality of image-collection dimensions. User input selecting one of the sequence of thumbnail images is received (626). When the user input is received, the first two-dimensional image grid is updated to present a second plurality of images associated with a value represented by the selected thumbnail image in the one of the plurality of image-collection dimensions (628). In some implementations, the second plurality of images that are visible in the first two-dimensional image grid are visually manipulated according to the visual manipulation that was previously applied to the first plurality of images (630).

Figure 7:
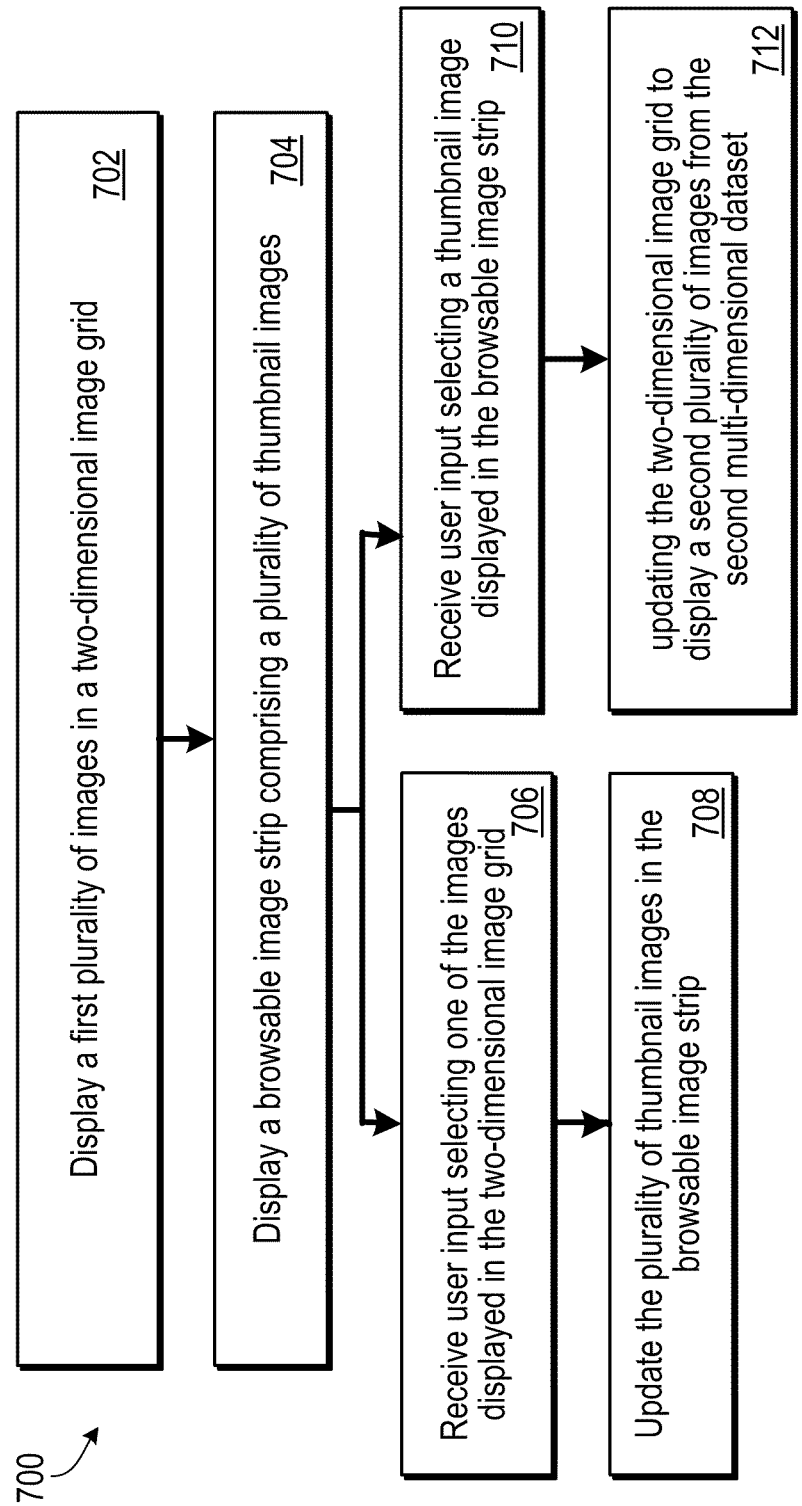
FIG. 7 is a flow diagram of an exemplary process for coordinated manipulation of an image grid and a browsable image strip in a dataset viewer.

Example Processes for Implementing the Coordinated Interaction between an Image Grid and an Image Strip FIG. 7 is a flow diagram for an exemplary process 700 for implementing coordinated interaction between an image strip and an image grid in a dataset viewer. There are several ways the interaction can take place depending on the associated dimension(s) of the image strip and the associated dimensions of the image grid, as described with respect to the following implementations, each of which is illustrated by FIG. 7.

In a first embodiment, the thumbnail images in an image strip are updated according to the currently selected image in the image grid. The thumbnail images are derived based on source images that are associated with the selected image in one or more image-collection dimensions.

In the first embodiment, a first plurality of images are displayed in a two-dimensional image grid (702). A first and a second dimension of the two-dimensional image grid are selected from a plurality of image-collection dimensions including Time, Stage, Channel, and Focus position. The first plurality of images are selected from a first multi-dimensional dataset that include images of a biological sample. Each of the first plurality of images is associated with a respective value in each of the first and the second dimensions of the two-dimensional image grid. The first plurality of images are associated with a common value in a third dimension selected from the plurality of image-collection dimensions and are ordered in the first two-dimensional image grid according to the associated values of the images in each of the first and the second dimensions.

A browsable image strip is displayed (704). The browsable image strip includes a plurality of thumbnail images. The plurality of thumbnail images can be derived from a first set of source images from the plurality of multi-dimensional datasets and represent a plurality of values in a respective image-collection dimension. The respective image-collection dimension can be selected from a second plurality of image-collection dimensions including Time, Channel, Stage, Focus Position, and Data Set.

User input selecting one of the images displayed in the two-dimensional image grid is received (706). After the user input is received, the plurality of thumbnail images in the browsable image strip is updated (708), and the updated plurality of thumbnail images are derived from a second set of source images from a plurality of multi-dimensional datasets. The second set of source images is different from the first set of source images. The second set of source images is associated with the respective values of the selected image in one or more of the first and the second dimensions. In some implementations, each of the second set of source images is associated with the respective values of the selected image in both the first and the second dimensions.

In a second embodiment, a dataset can be selected from a Data Set image strip, and the images from the newly selected dataset can be displayed in the image grid, replacing the previous set of images occupying the image grid. The state of the image grid prior to the selection of the new dataset can be used for the new dataset such that the user can easily compare the new set of images with a corresponding set of images previously occupying the image grid.

In the second embodiment, a first plurality of images in a two-dimensional image grid is displayed (702). A first and a second dimension of the two-dimensional image grid are selected from a plurality of image-collection dimensions including Time, Stage, Channel, and Focus Position (Z). The first plurality of images are selected from a first multi-dimensional dataset that include images of a biological sample. Each of the first plurality of images is associated with a respective value in the first and the second dimensions. The plurality of images can be associated with a common value in a third dimension selected from the plurality of image-collection dimensions and are ordered in the two-dimensional image grid according to the associated values of the images in each of the first and the second dimensions.

A browsable image strip can be displayed (704). The browsable image strip includes a plurality of thumbnail images, and each of the plurality of thumbnail images represents a respective multi-dimensional dataset in a plurality of multi-dimensional datasets.

User input selecting a thumbnail image displayed in the browsable image strip is received, where the selected thumbnail image represents a second multi-dimensional dataset (710). The second multi-dimensional dataset is different from the first multi-dimensional dataset. The two-dimensional image grid is updated to display a second plurality of images from the second multi-dimensional dataset (712). The second plurality of images are associated with the associated values of the first plurality of images in the first, second, and third dimensions and are ordered in the two-dimensional image grid according to the images' associated values in each of the first and the second dimensions.

In a third embodiment, an image grid is associated with a value in a third dimension. If the user selects a thumbnail from an image strip that represent a different value in the third dimension, all the images in the image grid are replaced with images associated with the newly selected value in the third dimension. The state of the image grid prior to the selection of the new value can be preserved for the new set of images such that the user can easily compare the new set of image with a corresponding set of image previously occupying the image grid.

In the third embodiment, a first plurality of images is displayed in a two-dimensional image grid (702). A first and a second dimension of the two-dimensional image grid are selected from a plurality of image-collection dimensions including Time, Stage, Channel, and Focus Position (Z). The first plurality of images can be selected from a multi-dimensional dataset including images of a biological sample. Each image in the first plurality of images is associated with a respective value in each of the first and the second dimensions. The first plurality of images are associated with a first value in a third dimension selected from the plurality of image-collection dimensions and are ordered in the two-dimensional image grid according to the associated values of the images in each of the first and the second dimensions.

A browsable image strip can be displayed (704). The browsable image strip can include a plurality of thumbnail images, each of the plurality of thumbnail images representing a respective value in the third dimension.

User input selecting one of the plurality of thumbnail images displayed in the browsable image strip is received (710). The selected thumbnail image represents a second value in the third dimension, the second value being different from the first value.

The two-dimensional image grid can be updated to display a second plurality of images from the multi-dimensional dataset (712). The second plurality of images can be associated with the second value in the third dimension, and each of the second plurality of images corresponds to one of the first plurality of images in associated values in the first and the second dimensions.

Display of Images from Multi-Dimensional Datasets

The methods and systems described in the specification can be applied to various fields, such as astronomy, nuclear imaging, medical imaging, meterology, petrology, geology, and so on. A few features described herein provide particular benefits when applied to microscopy imaging of biological samples.

For example, in some implementations, to display images in a two-dimensional image grid, a plurality of composite images can be generated by overlaying multiple constituent images from multiple focus positions or multiple channels, and each of the plurality of composite images are associated with a respective value in each of the first and the second dimensions. The plurality of composite images can be displayed in the two-dimensional image grid according to the associated values of the composite images in each of the first and the second dimensions.

In some implementations, to display images in a two dimensional image grid, a plurality of composite images can be generated by overlaying multiple constituent images, where each of the plurality of composite images are associated with a respective value in each of the first and the second dimensions, and at least one object present in one of the plurality of composite images is invisible in at least one of the multiple constituent images of the composite image. The plurality of composite images can be displayed in the two-dimensional image grid according to the associated values of the composite images in each of the first and the second dimensions.

In some implementations, a plurality of composite images can be generated by overlaying multiple constituent images from multiple channels. Each of the plurality of composite images are associated with a respective value in each of the first and the second dimensions, and the multiple constituent images include at least a grayscale image and a colored florescent image. The plurality of composite images can be displayed in the two-dimensional image grid according to the associated values of the composite images in each of the first and the second dimensions.

In some implementations, to display images in a two dimensional image grid, a plurality of composite images can be generated by overlaying multiple constituent images from multiple channels or multiple focus positions, where each of the plurality of composite images are associated with a respective value in each of the first and the second dimensions. The plurality of composite images can be displayed in the two-dimensional image grid according to the associated values of the composite images in each of the first and the second dimensions. User input modifying a display option for one of the multiple channels or multiple focus positions can be received and the plurality of composite images displayed in the two-dimensional image grid can be updated by independently modifying the constituent images from the one of the multiple channels or focus positions according to the modified display option.

Microscopy Systems and Apparatus

Figure 8:
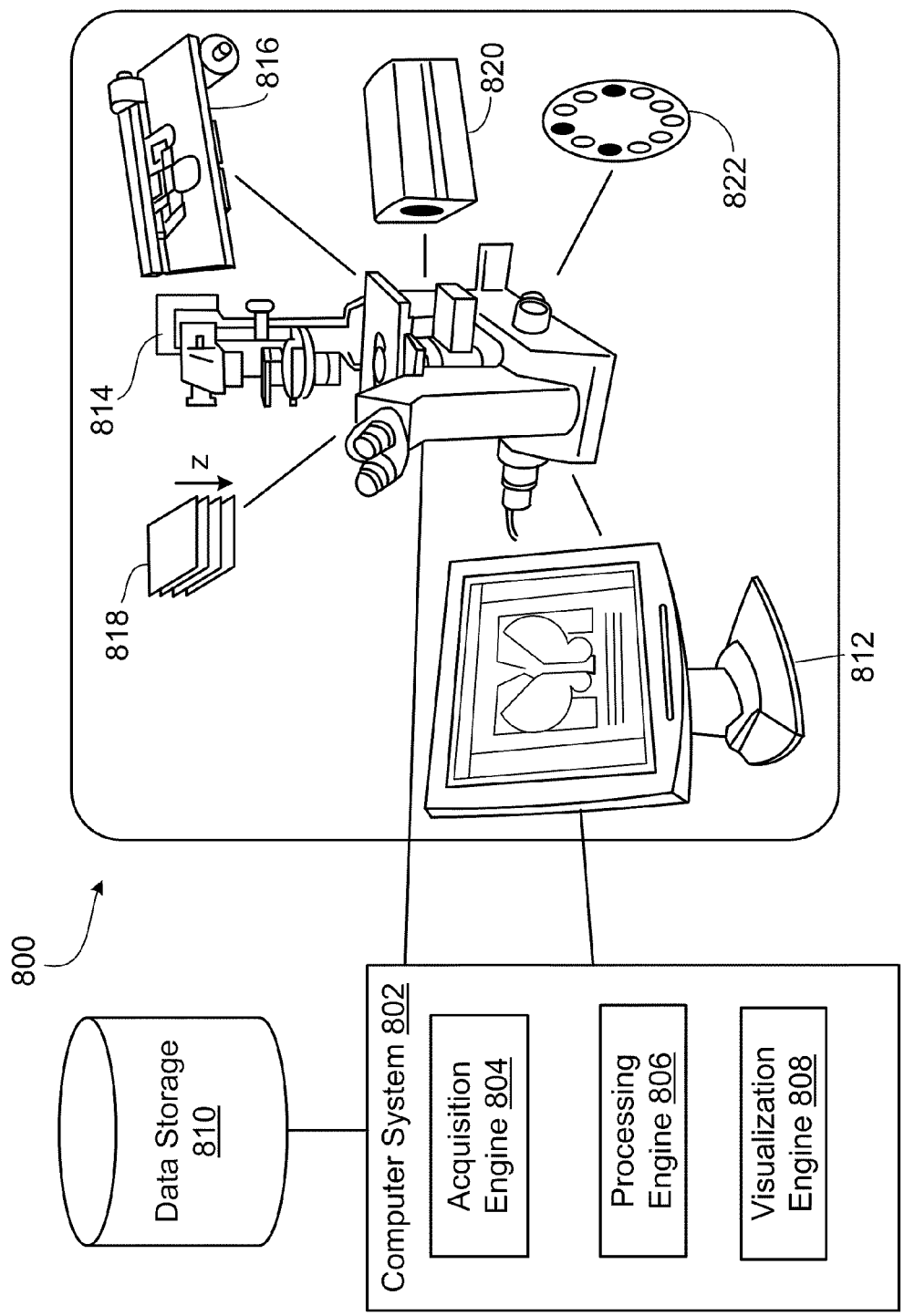
FIG. 8 is an exemplary integrated multi-dimensional microscopy system, as may produce image and numerical data for processing with the technology described herein.

FIG. 8 depicts, schematically, an exemplary integrated multi-dimensional microscopy system 800 that can be used to implement the methods and systems disclosed in this specification.

The exemplary integrated multi-dimensional microscopy system 800 includes a computer system 802, a microscopy imaging system 814, a display device 812, and a data storage device 810. The microscopy system 814 includes an image acquisition devices such as a charge-coupled device (CCD) camera 820 and can include components such as motorized stages 816, Z motors 818, motorized filter wheel shutters 822, monochromators (not shown), piezo-electric focus devices (not shown), analog to digital converters for electric signals (not shown), and so on. The computer system 802 includes software components, such as an acquisition engine 804, a processing engine 806, a visualization engine 808, and communication modules (not shown) for communicating with the other software and hardware components of the integrated multi-dimensional microscopy system 800, and optionally also for communicating with other computing devices not shown in FIG. 8. Display 812 may be considered an integral part of computer system 802, or a part of the imaging system 814, or may be connected directly to both.

The integrated multi-dimensional microscopy system 800 can acquire images at a high speed in multiple dimensions, such as the Z dimension, the Stage dimension, the Time dimension, the Channel dimension, and so on. The acquisition engine 804 of the computer system 802 includes software instructions for controlling the various components of the microscopy system during image acquisition. For example, the acquisition engine can control the manipulations of the motorized stages 816, the Z motors 818, the filter wheels shutters 822, the monochromators, the piezo-electric focus devices, and so on. The acquisition engine 804 can allow the user to provide setup parameters for the microscope and other hardware controls, such as illumination, magnification, focus, acquisition speed, imaging location, camera settings, and so on.

Images acquired by multi-dimensional microscopy system 800 can be stored in temporary storage (e.g., RAM of the computer system 802) for instant replay or selection by the user. Images can subsequently be stored in the data storage 810 for permanent storage and future process and access.

The processing engine 806 can include instructions for processing the acquired images and to derive measurement data from the images. For example, the processing engine 806 can create composite images based on multiple images or image series, create movie sequence, stitch images, create intensity profiles, adjust image contrast, perform binary operations (e.g., invert, erode, and dilate), apply various image filters (e.g., low pass, sharpen, median filter, haze, segmentation, etc.), reduce background, correct shading, perform Fast Fourier Transform operations, identify objects and boundaries within images, and so on. The processing engine 806 can also perform various analyses on the images and measurements.

The visualization engine 808 can include software instructions for implementing a user interface for presenting the images and measurement data acquired during multi-dimensional microscopy experiments. The integrated multi-dimensional data visualization interface disclosed in this specification can be implemented in the visualization engine 808. The software instructions can be implemented in any of several programming languages known to those skilled in the art of programming digital computers. Preferred languages include those that are effective for high intensity numerical operations as well as those that are tailored towards graphical manipulations such as display and transformations of windows. Such languages include, but are not limited to: C, C++, Visual Basic, and Fortran.

Other software and hardware components can be included in the example multi-dimensional microscopy system 800. In some implementations, not all components shown in FIG. 8 need to be included.

Computing Apparatus

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions (such as applets, functions, and subroutines), encoded on one or more computer storage media for execution by, or to control the operation of, a data processing apparatus. Alternatively or in addition, the program instructions can be encoded on an artificially-generated propagated signal, e.g., a machine-generated electrical, optical, or electromagnetic signal, that is generated to encode information for transmission to a suitable receiver apparatus for execution by a data processing apparatus. A computer storage medium can be, or be included in, a computer-readable storage device, a computer-readable storage substrate, a random or serial access memory array or device, or a combination of one or more of such devices. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CD's, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple chips, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) that embodies the methods described herein can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows described herein can also be performed by, and apparatus can also be implemented as, special purpose logic circuitry, e.g., an FPGA (field programmable gate array) or an ASIC (application-specific integrated circuit).

Processors suitable for the execution of a computer program as described herein include, by way of example, both general and special purpose microprocessors, and any one or more processors of any kind of digital computer. Generally, a processor will receive instructions and data from a read-only memory (ROM) or a random access memory (RAM) or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not include or be coupled to any or all such devices. Moreover, a computer for use herein can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a cathode ray tube (CRT), organic electroluminescent display (OED), or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system as used herein can include clients and servers. A client and server are generally remote from each other and typically interact through a communication network. The relationship of client and server arises by virtue of computer programs running on the respective computers and having a client-server relationship to each other. In some embodiments, a server transmits data (e.g., a hypertext markup language (HTML) page to a client device (e.g., for purposes of displaying data to and receiving user input from a user interacting with the client device). Data generated at the client device (e.g., a result of the user interaction) can be received from the client device at the server.

Figure 9:
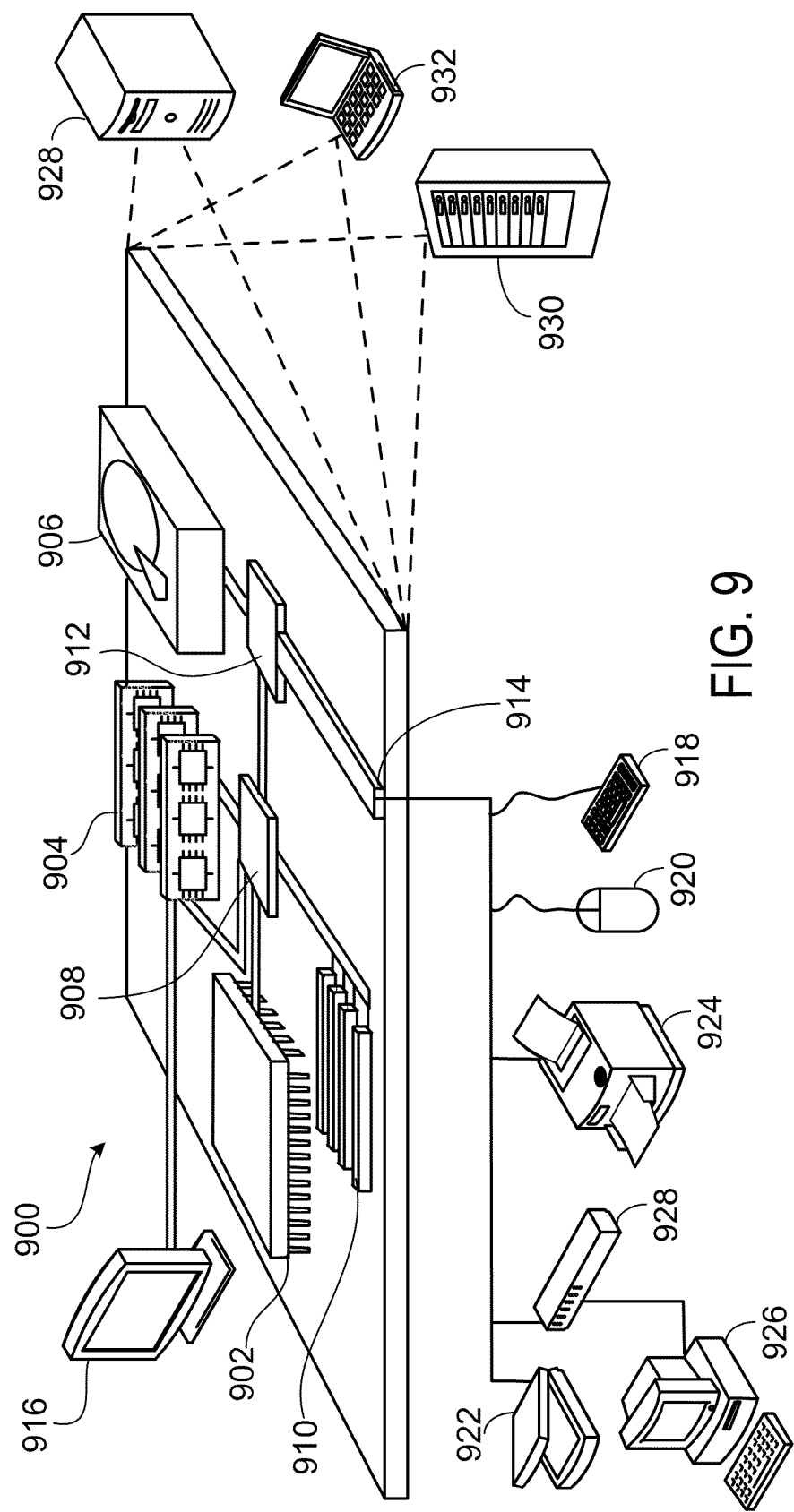
FIG. 9 is a general purpose computing device, as may be configured for use with the technology described herein.

An example of one such type of computer for use with a microscopy system herein is shown in FIG. 9. The computing system 900 shown in FIG. 9 may be used to implement the systems and methods described in this document. System 900 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

Computing system 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the system 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing systems 900 may be connected, with each device providing portions of the necessary operations (e.g., as a server bank, a group of blade servers, or a multi-processor system).

The memory 904 stores information within the computing system 900 and output to printers, etc., as shown in FIG. 9. In one implementation, the memory 904 is a computer-readable medium. In one implementation, the memory 904 is a volatile memory unit or units. In another implementation, the memory 904 is a non-volatile memory unit or units.

The storage device 906 is capable of providing mass storage for the computing system 900. In one implementation, the storage device 906 is a computer-readable medium. In various different implementations, the storage device 906 may be a floppy disk device, a hard disk device, an optical disk device, or a tape device, a flash memory or other similar solid state memory device, or an array of devices, including devices in a storage area network or other configurations.

In one implementation, a computer program product is tangibly embodied in an information carrier. The computer program product contains instructions that, when executed, perform one or more methods, such as those described elsewhere herein. The information carrier is a computer- or machine-readable medium, such as the memory 904, the storage device 906, or memory on processor 902.

The high speed controller 908 manages high bandwidth-intensive operations for the computing system 900, while the low speed controller 912 manages lower bandwidth-intensive operations. Such allocation of duties is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard 918, a pointing device 920, a scanner 922, a printer 924, or a networking device 926 such as a switch or router, e.g., through a network adapter 928.

The computing system 900 may be implemented in a number of different forms, as shown in the figure. For example, it may be implemented as a standard server 928, or multiple times in a group of such servers. It may also be implemented as part of a rack server system 930. In addition, it may be implemented in a personal computer such as a laptop computer 932 or a mobile device (not shown). Alternatively, components from computing system 900 may be combined with other components in a mobile device (not shown). Each of such devices may contain one or more of computing systems 900, and an entire system may be made up of multiple computing systems communicating with each other.

Other Embodiments

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method for presenting data to a user, comprising: displaying a first plurality of images in a first two-dimensional image grid, wherein a first and a second dimension of the first two-dimensional image grid are selected from a plurality of image-collection dimensions including Time, Stage, Channel, and Focus Position, wherein the first plurality of images are selected from a first multi-dimensional dataset comprising images of a biological sample, each image in the first plurality of images being associated with a respective value in each of the first and the second dimensions, and wherein the first plurality of images are associated with a common value in a third dimension selected from the plurality of image-collection dimensions and are ordered in the first two-dimensional image grid according to the associated values of the images in the first and the second dimensions; receiving user input for visually manipulating one of the first plurality of images displayed in the first two-dimensional image grid, the user input including one or more of zooming, panning, and thresholding; and simultaneously updating views of the first plurality of images that are visible in the first two-dimensional image grid by applying the user input to the first plurality of images.

2. The method of claim 1, further comprising: prior to receiving user input for visually manipulating one of the first plurality of images, displaying a second plurality of images from a second multi-dimensional dataset in a second two-dimensional image grid, wherein the simultaneous updating also updates views of each image that is visible in the second two-dimensional image grid.

3. The method of claim 2, wherein each of the second plurality of images is associated with a respective value in each of the first and the second dimensions.

4. The method of claim 1, further comprising: displaying a table, the table comprising numeric measurement data derived from one or more of the first plurality of images; receiving user input selecting the numeric measurement data in the table; and
updating the first two-dimensional image grid to visually emphasize the one or more images from which the selected numeric measurement data was derived.

5. The method of claim 4, wherein the selected numeric measurement data is associated with an object in the one or more of the first plurality of images, and the method further comprises: visually emphasizing the object in the images that are visible in the first two-dimensional image grid.

6. The method of claim 1, further comprising: displaying a graph, the graph comprising data points representing numeric measurement data derived from one or more of the first plurality of images; receiving user input selecting one or more data points on the graph; and updating the first two-dimensional image grid to visually emphasize the one or more images corresponding to the selected data points.

7. The method of claim 1, further comprising: displaying a browsable image strip comprising a sequence of thumbnail images, the sequence of thumbnail images representing a sequence of values in one of the plurality of image-collection dimensions; receiving user input selecting one of the sequence of thumbnail images; and updating the first two-dimensional image grid to present a second plurality of images associated with a value represented by the selected thumbnail image in the one of the plurality of image-collection dimensions.

8. The method of claim 7, further comprising: visually manipulating the second plurality of images that are visible in the first two-dimensional image grid according to the visual manipulation that was applied to the first plurality of images.

9. The method of claim 1, wherein displaying images in a two-dimensional image grid further comprises: generating a plurality of composite images by overlaying multiple constituent images from multiple focus positions or multiple channels, wherein each of the plurality of composite images are associated with a respective value in each of the first and the second dimensions; and displaying the plurality of composite images in the two-dimensional image grid according to the associated values of the composite images in each of the first and the second dimensions.

10. The method of claim 1, wherein displaying images in a two-dimensional image grid further comprises: generating a plurality of composite images by overlaying multiple constituent images, wherein each of the plurality of composite images are associated with a respective value in each of the first and the second dimensions, and at least one object present in one of the plurality of composite images is invisible in at least one of the multiple constituent images of the composite image; and displaying the plurality of composite images in the two-dimensional image grid to according to the associated values of the composite images in each of the first and the second dimensions.

11. The method of claim 1, wherein displaying images in the two-dimensional image grid further comprises: generating a plurality of composite images by overlaying multiple constituent images from multiple channels, wherein each of the plurality of composite images are associated with a respective value in each of the first and the second dimensions, and the multiple constituent images including at least a grayscale image and a colored florescent image; displaying the plurality of composite images in the two-dimensional image grid according to the associated values of the composite images in each of the first and the second dimensions.

12. The method of claim 1, wherein displaying images in the two-dimensional image grid further comprises: generating a plurality of composite images by overlaying multiple constituent images from multiple channels or multiple focus positions, wherein each of the plurality of composite images are associated with a respective value in each of the first and the second dimensions; and displaying the plurality of composite images in the two-dimensional image grid according to the associated values of the composite images in each of the first and the second dimensions, and the method further comprises:

receiving user input modifying a display option for one of the multiple channels or multiple focus positions; and updating the plurality of composite images displayed in the two-dimensional image grid by independently modifying the constituent images from the one of the multiple channels or focus positions according to the modified display option.

13. A computer-implemented method for presenting data to a user, comprising:

displaying a plurality of images in a two-dimensional image grid, wherein a first and a second dimension of the two-dimensional image grid are selected from a plurality of image-collection dimensions including time, stage, channel, and focus position, wherein the plurality of images are selected from a first multi-dimensional dataset comprising images of a biological sample, each of the plurality of images being associated with a respective value in each of the first and the second dimensions, and wherein the plurality of images are associated with a common value in a third dimension selected from the plurality of image-collection dimensions and are ordered in the first two-dimensional image grid according to the associated values of the images in each of the first and the second dimensions; displaying a browsable image strip comprising a plurality of thumbnail images, the plurality of thumbnail images being derived from a first set of source images from one or more multi-dimensional datasets and representing a plurality of values in a respective image-collection dimension, the respective image-collection dimension being selected from a second plurality of image-collection dimensions including Time, Channel, Stage, Focus Position, and Data Set; receiving user input selecting one of the images displayed in the two-dimensional image grid; and updating the plurality of thumbnail images in the browsable image strip, the updated plurality of thumbnail images being derived from a second set of source images from the one or more multi-dimensional datasets, the second set of source images being different from the first set of source images, and the second set of source images being associated with the associated values of the selected image in one or more of the first and the second dimensions.

14. The method of claim 13, wherein each of the second set of source images is associated with the associated values of the selected image in both the first and the second dimensions.

15. A computer-implemented method for presenting data to a user, comprising:

displaying a first plurality of images in a two-dimensional image grid, wherein a first and a second dimension of the two-dimensional image grid are selected from a plurality of image-collection dimensions including Time, Stage, Channel, and Focus Position, wherein the first plurality of images are selected from a first multi-dimensional dataset comprising images of a biological sample, each of the first plurality of images being associated with a respective value in the first and the second dimensions, and wherein the first plurality of images are associated with a common value in a third dimension selected from the plurality of image-collection dimensions and are ordered in the two-dimensional image grid according to the associated values of the images in each of the first and the second dimensions; displaying a browsable image strip comprising a plurality of thumbnail images, each of the plurality of thumbnail images representing a respective multi-dimensional dataset in a plurality of multi-dimensional datasets; receiving user input selecting a thumbnail image displayed in the browsable image strip, the selected thumbnail image representing a second multi-dimensional dataset, the second multi-dimensional dataset being different from the first multi-dimensional dataset; and updating the two-dimensional image grid to display a second plurality of images from the second multi-dimensional dataset, wherein the second plurality of images are associated with the associated values of the first plurality of images in the first, second, and third dimensions and are ordered in the two-dimensional image grid according to the associated values of the images in each of the first and the second dimensions.

16. A computer-implemented method for presenting data to a user, comprising:

displaying a first plurality of images in a two-dimensional image grid, wherein a first and a second dimension of the two-dimensional image grid are selected from a plurality of image-collection dimensions including Time, Stage, Channel, and Focus Position, wherein the first plurality of images are selected from a multi-dimensional dataset comprising images of a biological sample, each image in the first plurality of images being associated with a respective value each of the first and the second dimensions, and wherein the first plurality of images are associated with a first value in a third dimension selected from the plurality of image-collection dimensions and are ordered in the two-dimensional image grid according to the associated values of the images in each of the first and the second dimensions; displaying a browsable image strip comprising a plurality of thumbnail images, each of the plurality of thumbnail images representing a respective value in the third dimension; receiving user input selecting one of the plurality of thumbnail images displayed in the browsable image strip, the selected thumbnail image representing a second value in the third dimension, the second value being different from the first value; and updating the two-dimensional image grid to display a second plurality of images from the multi-dimensional dataset, wherein the second plurality of images are associated with the second value in the third dimension, and wherein each of the second plurality of images corresponds to one of the first plurality of images in associated values in the first and the second dimensions.

17. A system for presenting data to a user, comprising: one or more processors;

and memory coupled to the one or more processors and operable for storing instructions, which, when executed by the one or more processors, cause the one or more processors to perform operations, comprising: displaying a first plurality of images in a first two-dimensional image grid, wherein a first and a second dimension of the first two-dimensional image grid are selected from a plurality of image-collection dimensions including Time, Stage, Channel, and Focus Position, wherein the first plurality of images are selected from a first multi-dimensional dataset comprising images of a biological sample, each image in the first plurality of images being associated with a respective value in each of the first and the second dimensions, and wherein the first plurality of images are associated with a common value in a third dimension selected from the plurality of image-collection dimensions and are ordered in the first two-dimensional image grid according to the associated values of the images in the first and the second dimensions; receiving user input for visually manipulating one of the first plurality of images displayed in the first two-dimensional image grid, the user input including one or more of zooming, panning, and thresholding; and simultaneously updating views of the first plurality of images that are visible in the first two-dimensional image grid by applying the user input to the first plurality of images.

* * * * *